US012132277B2

(12) United States Patent
Neuman et al.

(10) Patent No.: US 12,132,277 B2
(45) Date of Patent: Oct. 29, 2024

(54) INTERCHANGEABLE UV LIGHT SYSTEM AND DOCKING PORT FOR UV LIGHT DEVICES

(71) Applicant: AMS Spectral UV, River Falls, WI (US)

(72) Inventors: Noel E. Neuman, Woodbury, MN (US); William M. Poor, Ellsworth, WI (US)

(73) Assignee: AMS Spectral UV, River Falls, WI (US)

(*) Notice: Subject to any disclaimer, the term of this patent is extended or adjusted under 35 U.S.C. 154(b) by 272 days.

(21) Appl. No.: 17/692,971

(22) Filed: Mar. 11, 2022

(65) Prior Publication Data

US 2022/0290847 A1 Sep. 15, 2022

Related U.S. Application Data

(60) Provisional application No. 63/159,977, filed on Mar. 11, 2021.

(51) Int. Cl.

| | |
|---|---|
| ***H01R 13/629*** | (2006.01) |
| ***H01R 13/627*** | (2006.01) |
| ***H01R 43/26*** | (2006.01) |

(52) U.S. Cl.

CPC ....... *H01R 13/629* (2013.01); *H01R 13/6272* (2013.01); *H01R 13/6276* (2013.01); *H01R 43/26* (2013.01)

(58) Field of Classification Search

CPC .. H01R 35/02; H01R 13/629; H01R 13/6272; H01R 13/6276; H01R 13/26; H01R 43/26; F21Y 2115/10

(Continued)

(56) References Cited

U.S. PATENT DOCUMENTS 8,517,750 B2 * 8/2013 Martinez ............... H01L 33/648 439/372
8,622,896 B1 1/2014 Termanini
(Continued)

FOREIGN PATENT DOCUMENTS

CN 102954454 A 3/2013
CN 208090482 U 11/2018

OTHER PUBLICATIONS

The International Search Report and Written Opinion rendered by the International Searching Authority for PCT/US2022/020023, dated Jun. 24, 2022, 7 pages.

*Primary Examiner* — Gary F Paumen
(74) *Attorney, Agent, or Firm* — Skaar Ulbrich Macari, P.A.

(57) ABSTRACT

An LED light device can be securely engaged on one of its ends with a docking port that includes electrical and coolant fluid fittings for the LED light device. The docking port can include a connection body, a plurality of fittings disposed on a common side of the connection body, a release lever and a guide rail. The plurality of fittings can include a first fitting configured to mate with the electrical fitting of the LED light device and a second fitting configured to mate with the first coolant fitting of the LED light device. The guide rail can extend forwardly from the connection body away from the common side of the connection body. The guide rail can slide in a channel defined in a sidewall of the LED light device. The release lever can be moved between a locked position and an unlocked position.

20 Claims, 25 Drawing Sheets

(58) Field of Classification Search
USPC .................................................. 439/179, 196
See application file for complete search history.

(56) References Cited

U.S. PATENT DOCUMENTS

| | | | | |
|---|---|---|---|---|
| 8,641,236 | B2 * | 2/2014 | Martinez | F21V 15/013<br>362/345 |
| 10,203,102 | B2 * | 2/2019 | Wertz | B41J 11/0021 |
| 10,823,386 | B2 | 11/2020 | Hauser et al. | |
| 2015/0233565 | A1 | 8/2015 | Lee et al. | |

* cited by examiner

INTERCHANGEABLE UV LIGHT SYSTEM AND DOCKING PORT FOR UV LIGHT DEVICES

PRIORITY

This application claims priority under 35 U.S.C. § 119(e) to, and hereby incorporates by reference in its entirety, U.S. Provisional Application No. 63/159,977, filed Mar. 11, 2021.

FIELD

The present invention generally relates to high intensity light emitting diode devices, and more particularly to docking ports for the same.

BACKGROUND

High intensity light emitting diode (LED) systems and devices are often used in curing systems to emit the radiation required to effect the curing operation. U.S. Pat. No. 8,641,236 discloses one such device and U.S. Pat. No. 10,203,102 discloses another such device. The entirety of the disclosures of U.S. Pat. Nos. 8,641,236 and 10,203,102 are incorporated herein by reference as part of this application. Such LED-based curing devices typically emit high intensity light in the ultraviolet range, and consequently are usually connected to both electrical power supplies and coolant supplies. A connector end cap is provided on one end of the LED device with external fittings to couple the coolant and the electrical power to the device.

These high intensity LED devices are used in a variety of machines and assemblies. They require regular cleaning and occasional maintenance. Occasionally a device fails. Installation and removal of the LED device from the machinery in which it is installed can be difficult and time consuming. Downtime for replacement of the LED device, regardless of the reason, leads to reduced production and increased costs. Thus there is a need for devices, methods and systems that provide for quick change of the LED device from their installed position.

SUMMARY

The disclosure includes an LED light device that can be securely engaged on one of its ends with a docking port that includes electrical and fluid fittings for the LED light device.

In one example, a docking port for a high intensity light emitting diode (LED) light device can include a connection body, a plurality of fittings disposed on a common side of the connection body, a release lever, and a guide rail extending forwardly from the connection body away from the common side of the connection body. The plurality of fittings can include a first fitting configured to mate with an electrical fitting of the LED light device and a second fitting configured to mate with a first coolant fitting of the LED light device.

The plurality of fittings disposed on a common side of the connection body can include a third fitting that is configured to mate with a second coolant fitting of the LED light device.

The guide rail can be configured to mate with a channel defined in a sidewall of the LED light device.

A pair of guide rails can be provided, wherein each of the pair of guide rails is spaced apart from one another and extend parallel to one another. Each of the pair of guide rails can be configured to mate with a respective channel defined in a pair of opposing sidewalls of the LED light device.

The release lever can be movable between a locked position and an unlocked position, wherein in the locked positon, the LED light device, when mated with the docking port, cannot be disengaged from the docking port, and wherein in the unlocked position, the LED light device can be disengaged from the docking port.

The docking port can include an electric conduit coupled to the connection body, which is in electric communication with the first fitting through the connection body and a fluid conduit coupled to the connection body, which is in fluidic communication with the second fitting through the connection body.

In another example, an interchangeable ultraviolet (UV) light system can include a high intensity UV light source and a docking port. The UV light source can include an elongated body and an end cap disposed at a longitudinal end of the elongated body. The end cap can include a first coolant fitting and an electrical fitting. The docking port can include a connection body, a plurality of fittings disposed on a common side of the connection body, a release lever and a guide rail. The guide rail can extend forwardly from the connection body away from the common side of the connection body. The plurality of fittings can include a first fitting configured to mate with an electrical fitting of the LED light device and a second fitting configured to mate with a first coolant fitting of the LED light device.

The end cap of the UV light source can include a third fitting that is configured to mate with a second coolant fitting of the UV light source.

The guide rail can be configured to mate with a channel defined in a sidewall of the UV light source. A pair of guide rails can be provided, wherein each of the pair of guide rails is spaced apart from one another and extending parallel to one another. Each of the pair of guide rails can mate with a respective channel defined in a pair of opposing sidewalls of the UV light source.

The release lever can be movable between a locked position and an unlocked position. In the locked positon, the UV light source, when mated with the docking port, cannot be disengaged from the docking port. In the unlocked position, the UV light source can be disengaged from the docking port.

An electric conduit can be coupled to the connection body, which is in electric communication with the first fitting through the connection body. A fluid conduit can be coupled to the connection body, which is in fluidic communication with the second fitting through the connection body.

The end cap of the UV light source can include a latch member that extends towards the docking port to secure the UV light source to the docking port when the UV light source is mated with the docking port.

A housing can be provided that is configured to enclose the UV light source and the docking port. The housing can include an openable end that is selectively closable via a door disposed on the openable end.

In a further example, a method of changing an LED light device can include moving a release lever of a docking port to which the LED light device is mated from a locked position and an unlocked position, disengaging an electrical fitting of the LED light device from a first fitting disposed on a first side of the docking port, disengaging a coolant fitting of the LED light device from a second fitting disposed on the first side of the docking port, and moving the LED light device away from the docking port in a direction away from the first side of the docking port.

A guide rail can slide along a channel defined in a sidewall of the LED light device as the LED device is moved away from the docking port.

A replacement LED device can be moved toward the docking port until an electrical fitting and a coolant fitting thereof are mated with a respective one of the first fitting and the second fitting, and the release lever can be moved from the unlocked position to the locked position.

The guide rail can slide along the channel defined in a sidewall of the replacement LED light device as the replacement LED device is moved toward the docking port.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
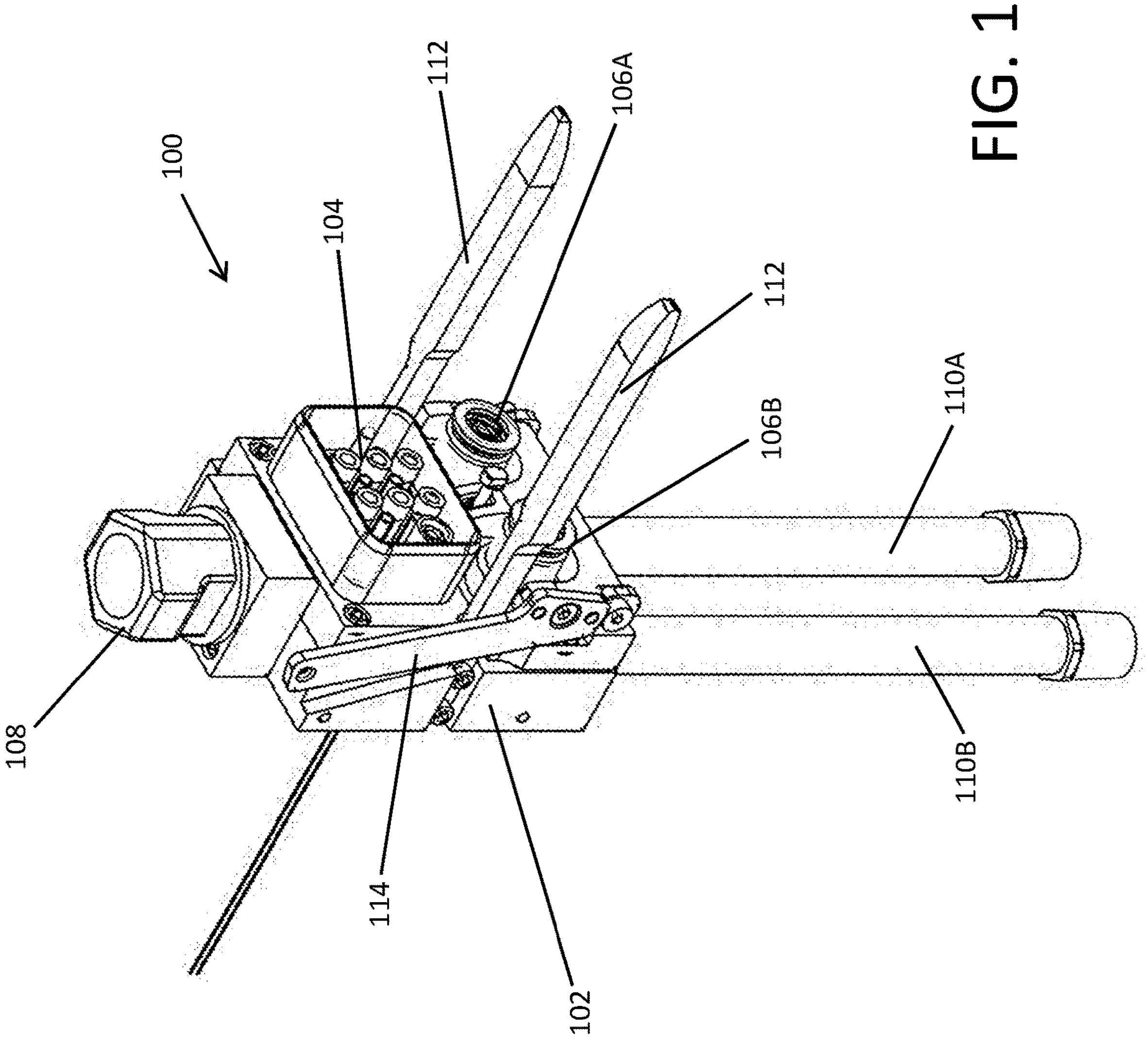
FIG. 1 is a perspective view of a docking port for LED devices according to certain embodiments.
Figure 2:
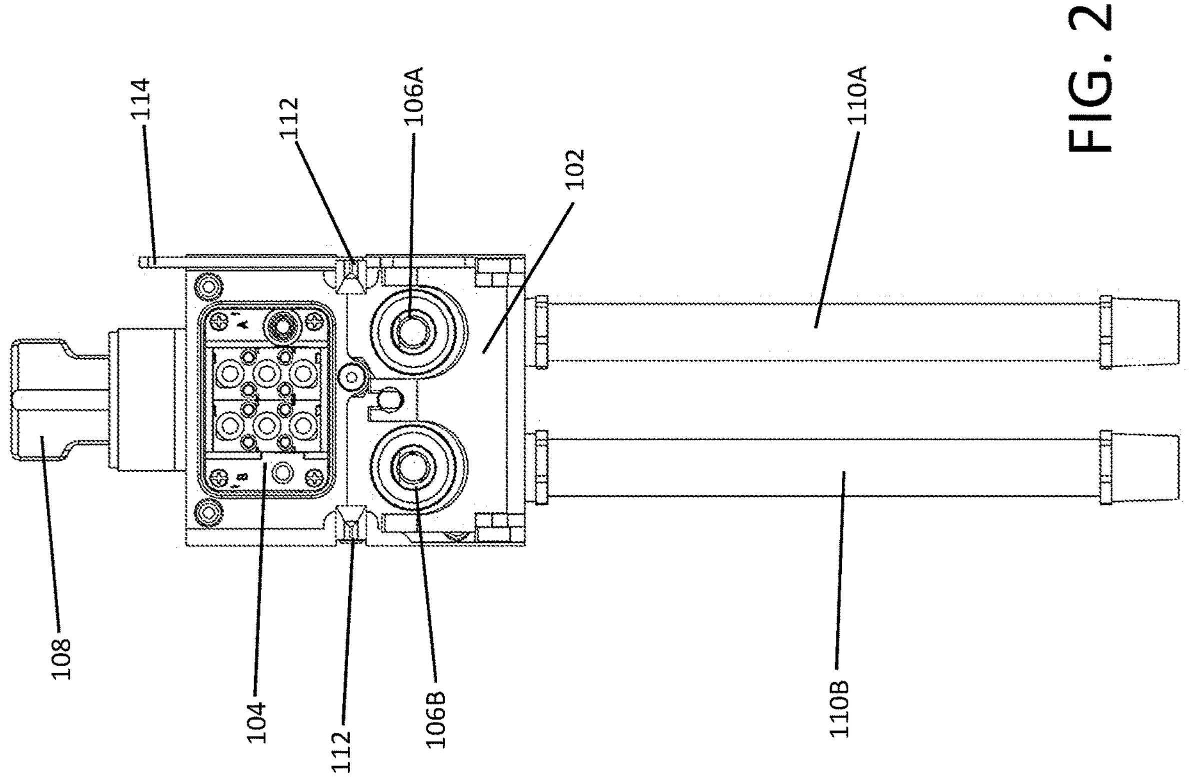
FIG. 2 is a front view of a docking port for LED devices according to certain embodiments.
Figure 3:
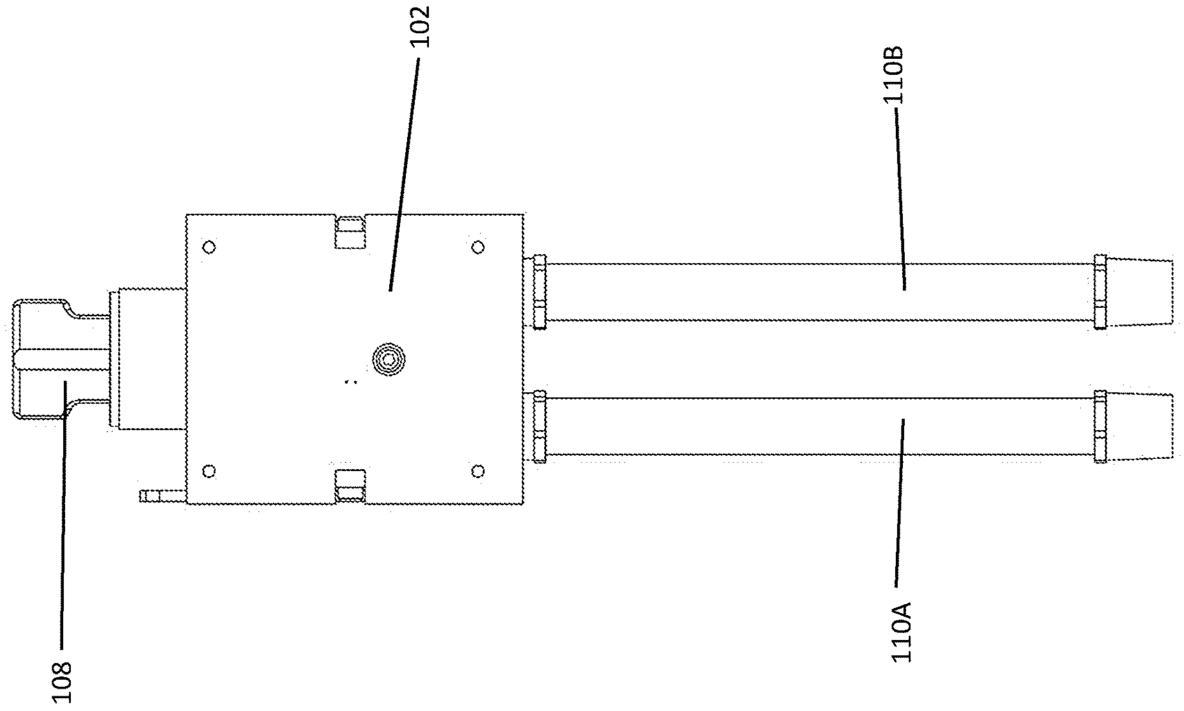
FIG. 3 is a rear view of a docking port for LED devices according to certain embodiments.
Figure 4:
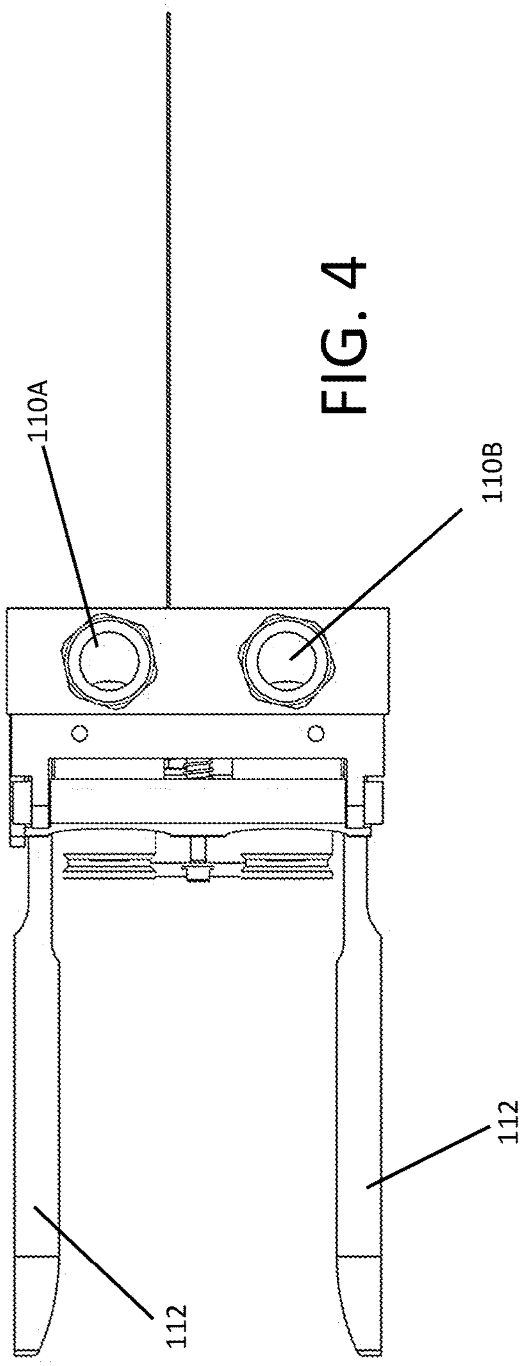
FIG. 4 is a top view of a docking port for LED devices according to certain embodiments.
Figure 5:
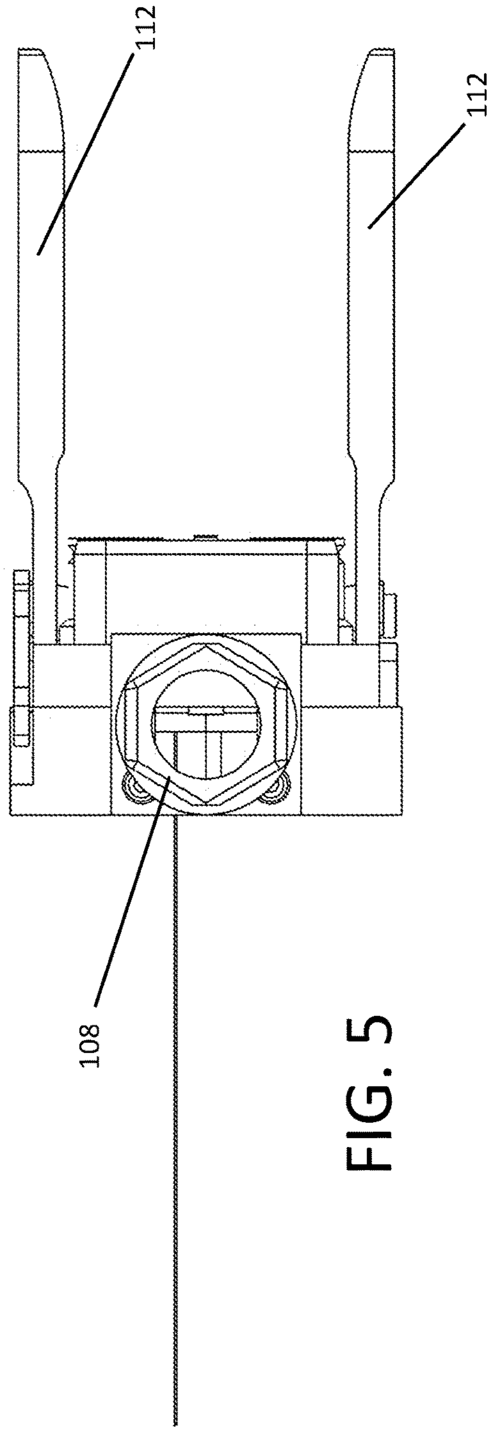
FIG. 5 is a bottom view of a docking port for LED devices according to certain embodiments.
Figure 6:
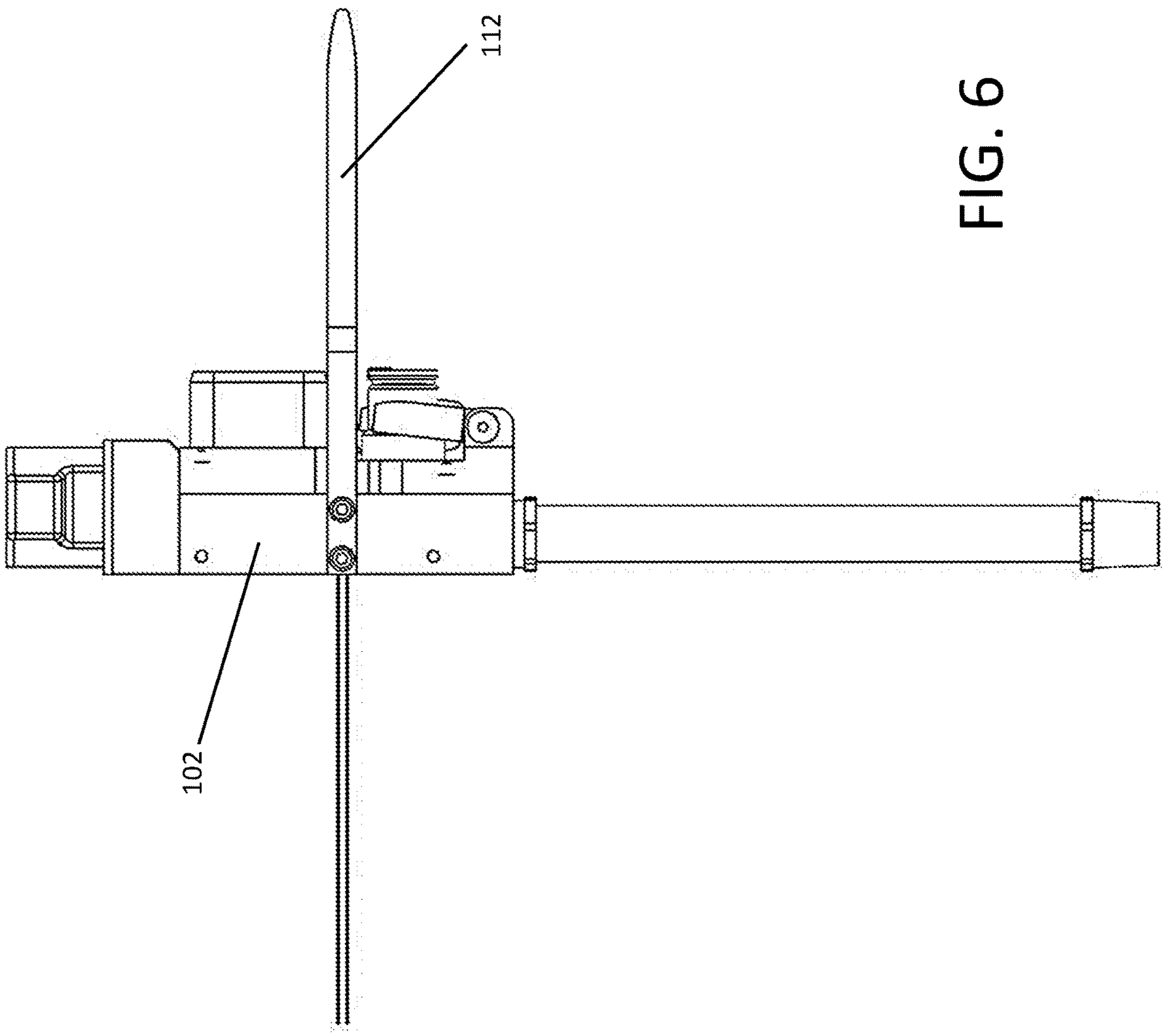
FIG. 6 is a side view of a docking port for LED devices according to certain embodiments.
Figure 7:
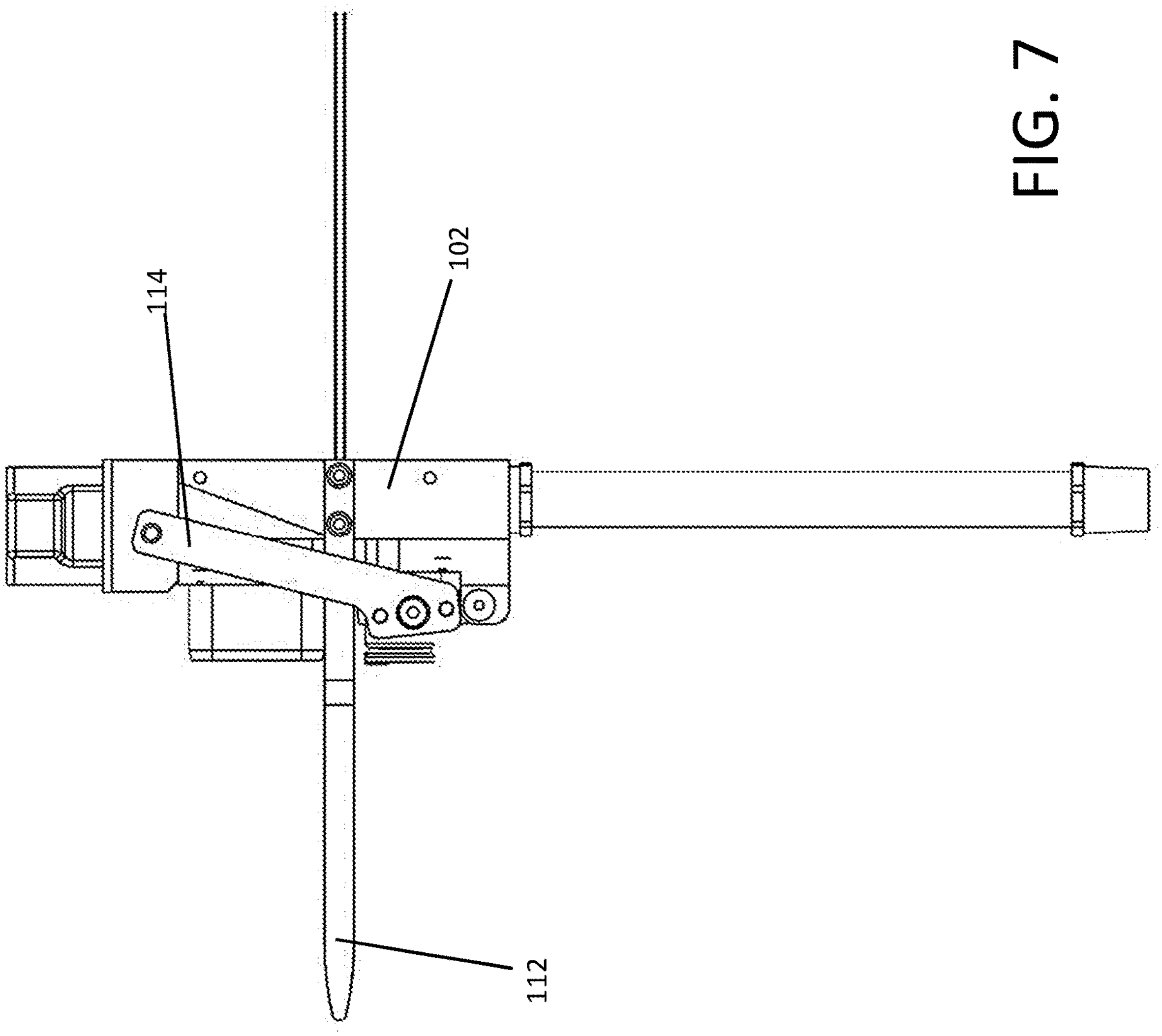
FIG. 7 is another side view of a docking port for LED devices according to certain embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following descriptions, the present invention will be explained with reference to example embodiments thereof. However, these embodiments are not intended to limit the present invention to any specific example, embodiment, environment, applications or particular implementations described in these embodiments. Therefore, description of these embodiments is only for purpose of illustration rather than to limit the present invention.

Reference will be made throughout to an LED light device and/or LED-based curing devices. However, the present invention can also be utilized with light emitting devices that utilize light generating means other than light emitting diodes (LEDs).

Referring to FIGS. 1-7, a docking port 100 for an LED light device (202 in later figures) comprises a connection body 102 including an electrical fitting 104 and a pair of coolant fittings 106A, 106B. The electrical fitting 104 is coupled within the body 102 to the electric supply conduit 108 that provides power for the LED device. The coolant fittings comprise an inlet fitting 106A that supplies cooled fluid to the inlet passage of the LED device and an outlet fitting 106B that receives the return of that fluid after it has completed one circuit of the LED device. The coolant fittings are coupled within the body 102 to the respective coolant supply 110A and return 110B line. The fittings 104, 106A, 106B are shown as facing outward from the same side of the body 102, but the electrical fitting or fittings could face a different direction from the coolant fittings 106A, 106B in alternative embodiments.

The docking port 100 further comprises a pair of guide rails 112 (also referred to as forks) that extend in a direction normal to a forward surface of the body and forward from the fittings 104, 106A, 106B, toward the LED device. The guide rails 112 can be arms disposed along or adjacent to opposite sides of the body 102.

A latch arm 114 (which may also be referred to as a release lever) is coupled to the body 102 to selectively engage and release locking collars on the coolant fittings 106A, 106B to securely engage, retain and lock the LED device to the docking port 100. In one example embodiment, the latch arm 114 is pivotally coupled to the body 102 adjacent a first end of the latch arm 114, and the opposing second end moves freely so that the user can actuate the latch arm 114 with their hand.

The docking port 100 can be formed of metal, plastic or other suitable materials. Each of the fittings 104, 106A, 106B are configured to mate with the respective companion fittings on the LED device.

Figure 8:
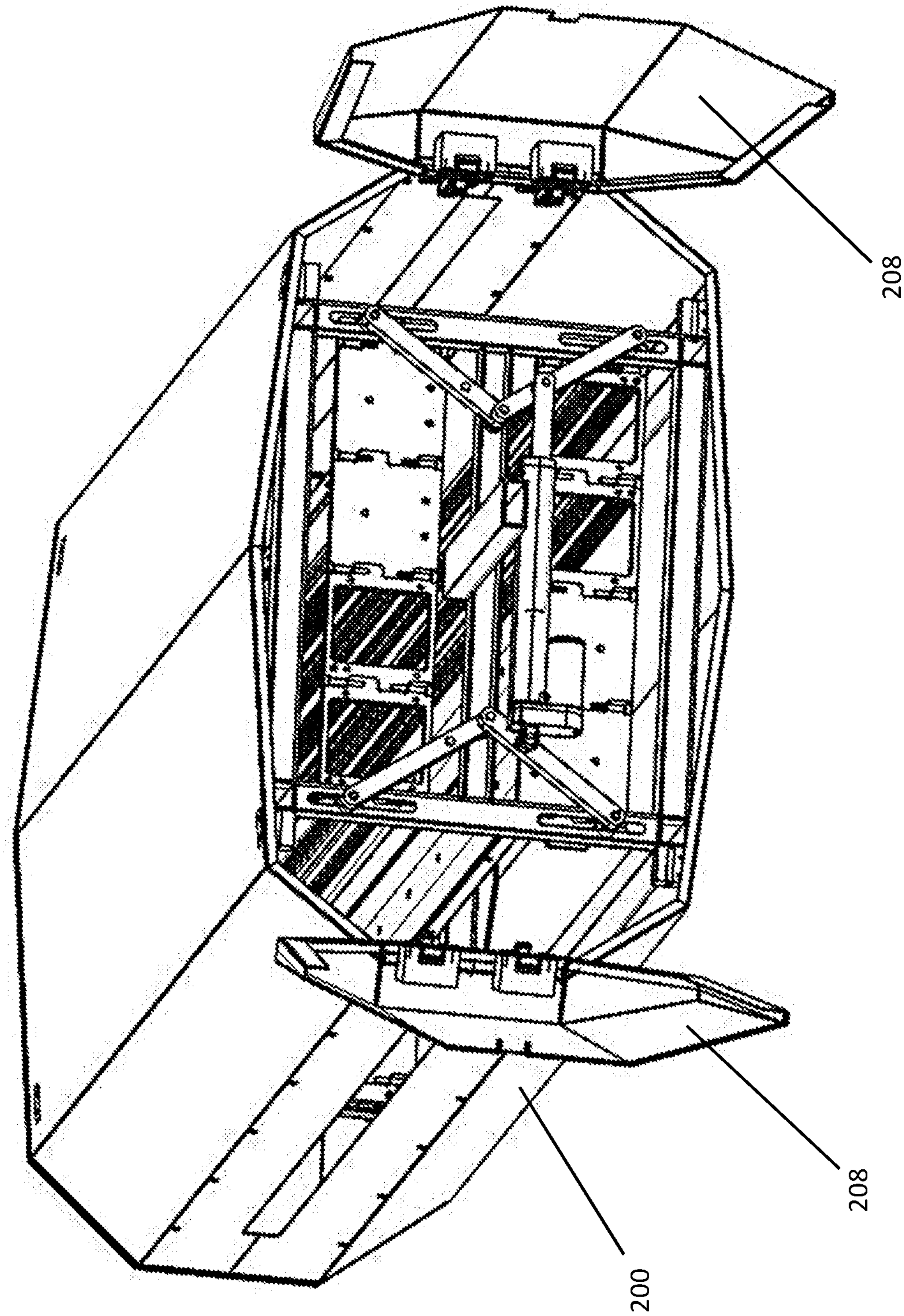
FIG. 8 is a perspective view of a housing for multiple LED light systems according to certain embodiments.
Figure 9:
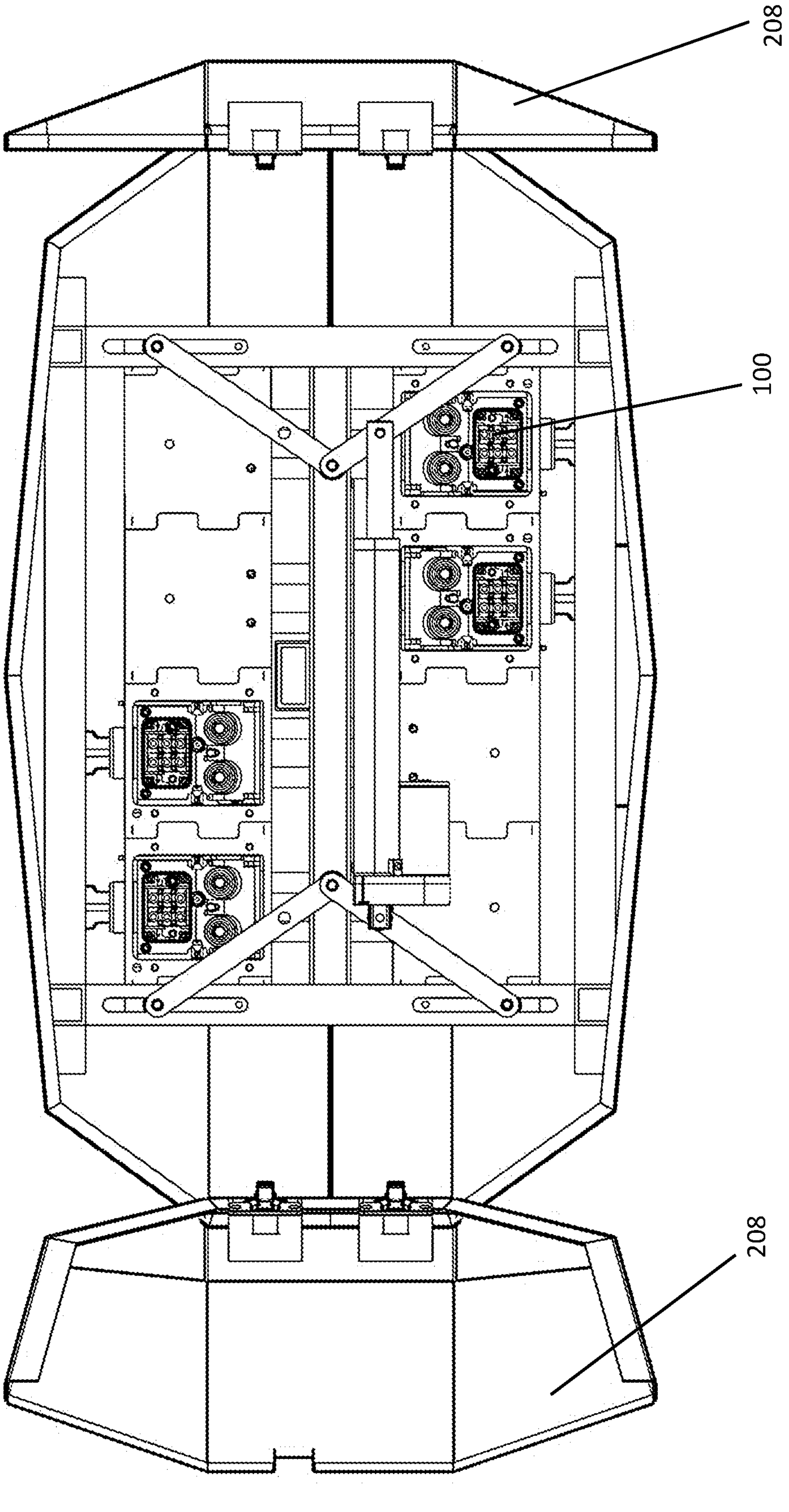
FIG. 9 is a front view of a housing for multiple LED light systems according to certain embodiments.
Figure 10:
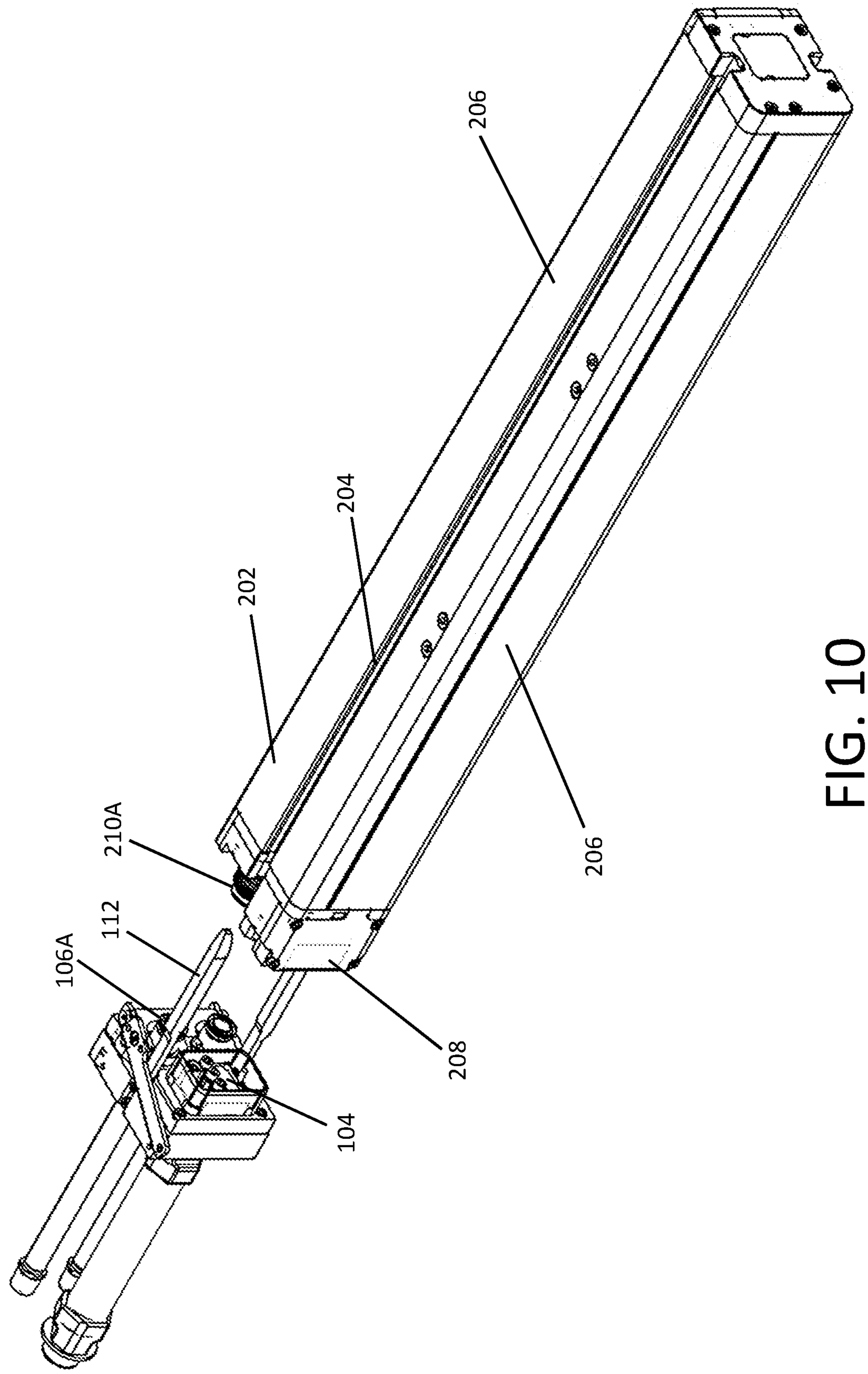
FIG. 10 is a perspective view of an LED light device aligned with a docking port prior to contact with the docking port according to certain embodiments.
Figure 11:
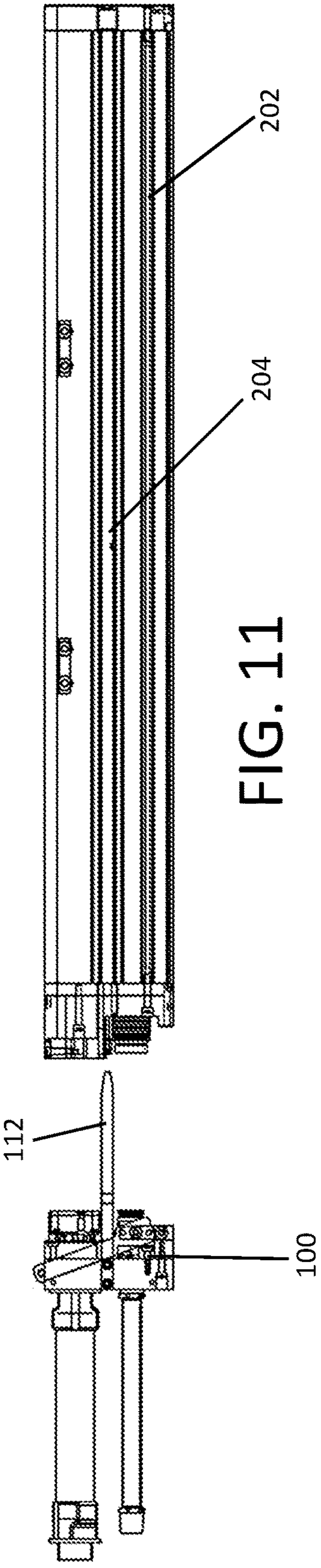
FIG. 11 is a side view of an LED light device aligned with a docking port prior to contact with the docking port according to certain embodiments.
Figure 12:
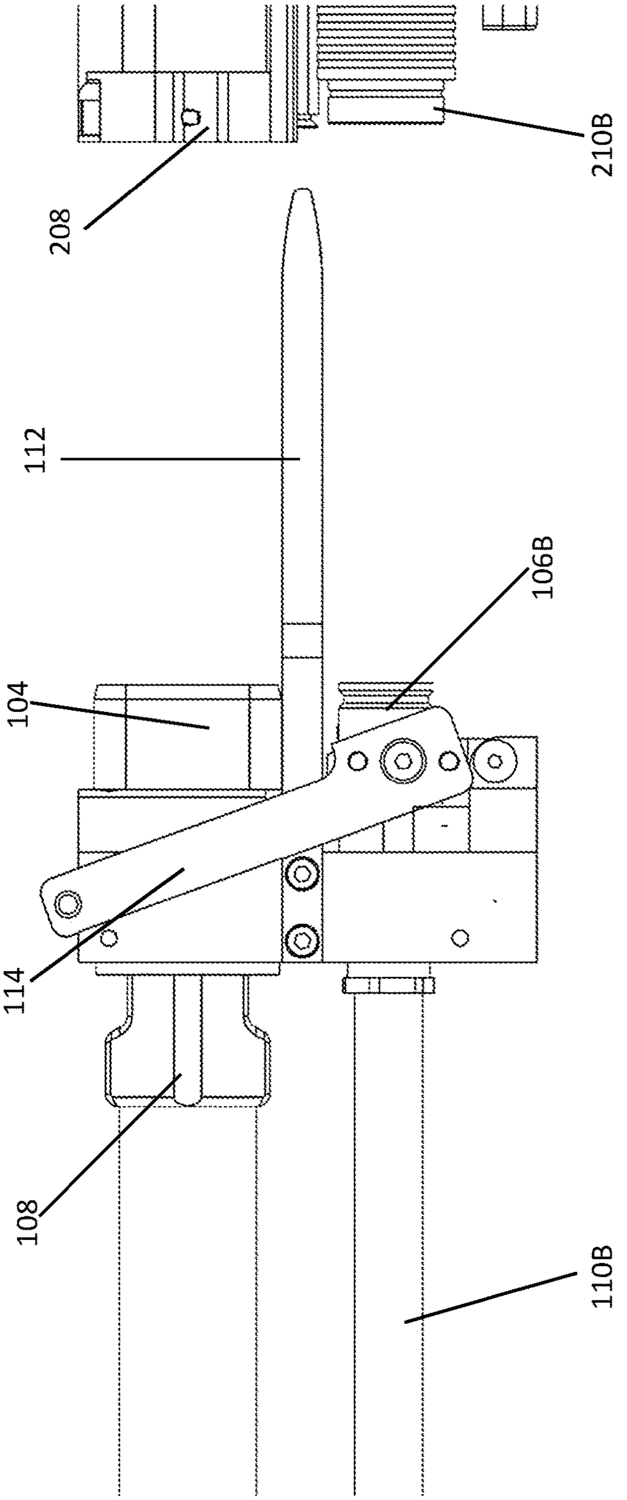
FIG. 12 is a close-up partial side view of an LED light device aligned with a docking port prior to contact with the docking port according to certain embodiments.
Figure 13:
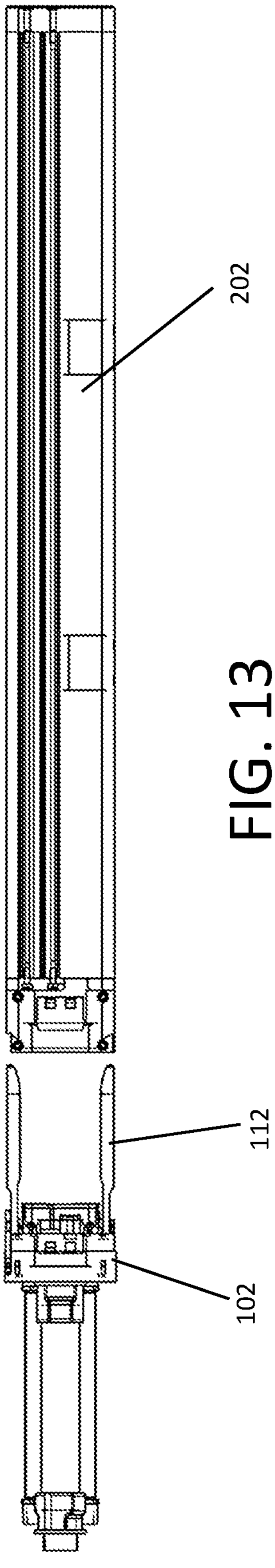
FIG. 13 is a top view of an LED light device aligned with a docking port prior to contact with the docking port according to certain embodiments.

Referring next to FIGS. 8-9, a housing 200 encloses multiple LED light devices 202 that are disposed within the housing 200. Materials and substances to be cured can be placed within or pass through the housing 200 and be exposed to the light of the LED devices 202 to cure the ink, glue, epoxy or other substance to be cured. The housing 200 defines an enclosure with a distal end 204 and a proximal end 206. As can be seen in FIG. 9, a plurality of docking ports 100 can be disposed at the distal end 204 of the housing 200 so that a plurality of LED devices can be disposed within the housing 200.

The proximal end 206 includes a pair of doors 208 that permit the housing to be fully enclosed when the doors are in the closed position, and so that the LED devices 202 can be easily accessed and replaced by a user. The doors 208 can be pivotally mounted to the fixed portion of the housing 200 via hinges or other means. A single door 208 can be provided in alternative embodiments.

Referring now to FIGS. 10-25, the engagement of an LED light device 202 with the docking port 100 will now be explained. First, in FIGS. 10-13, the LED light device 202 and docking port 100 are longitudinally aligned prior to contact so that the respective fittings of the docking port 100 and LED device 202 face one another. It can be seen that the guide rails 112 will engage corresponding channels 204 defined in the outer longitudinally-extending covers 206 or housings of the LED light device 202. Also, the electrical fitting 208 of the LED light device 100 will engage the electrical fitting 104 of the docking port 100. Moreover, the coolant fittings 106A, 106B will be engaged by the respective coolant fittings 210A and 210B of the LED light device 202.

Figure 14:
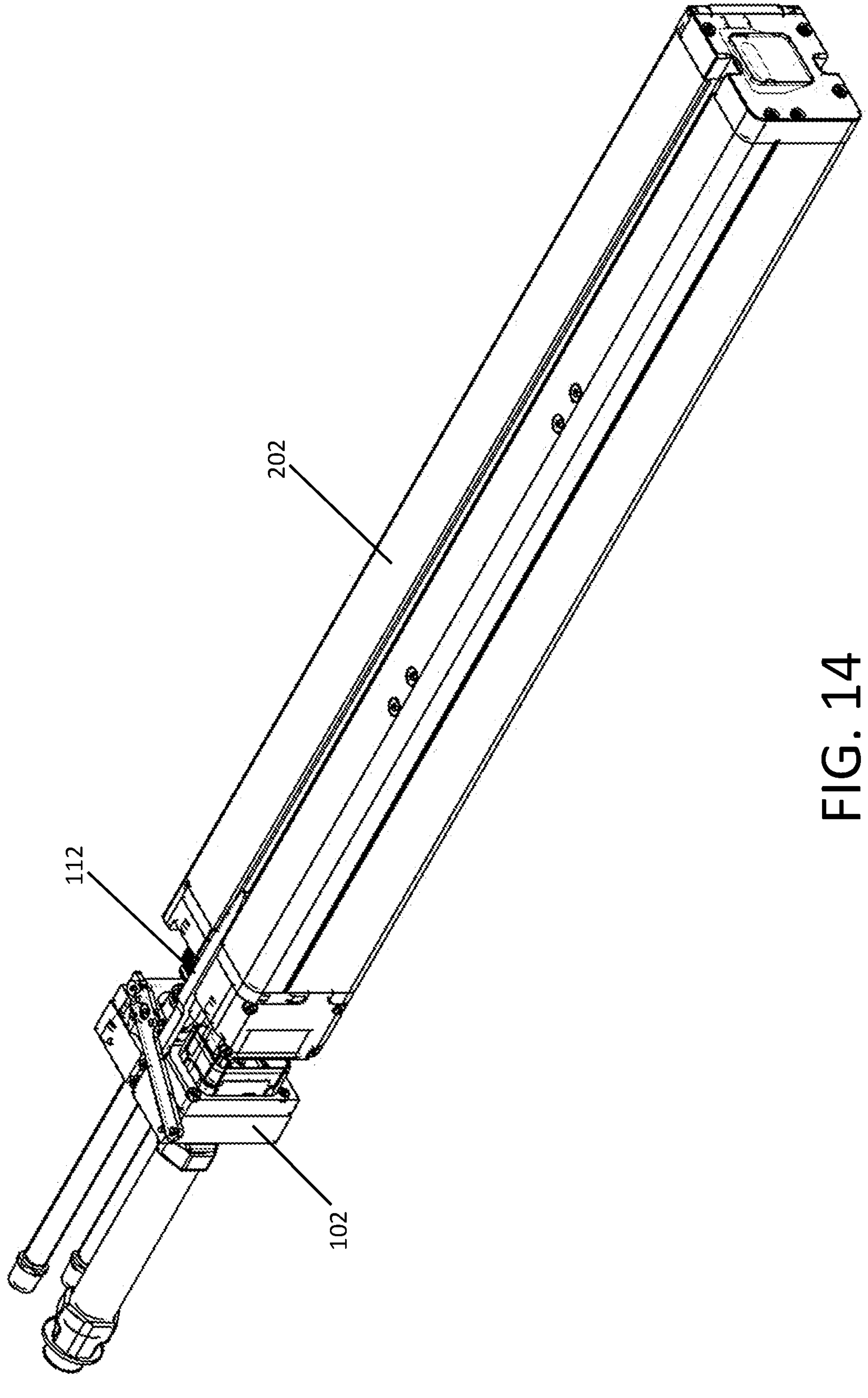
FIG. 14 is a perspective view of an LED light device partially engaged with a docking port according to certain embodiments.
Figure 15:
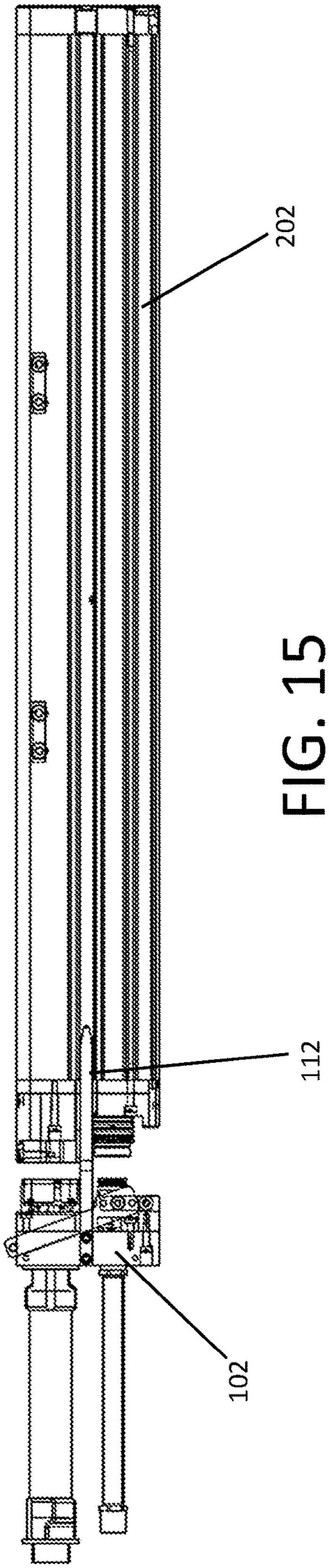
FIG. 15 is a side view of an LED light device partially engaged with a docking port according to certain embodiments.
Figure 16:
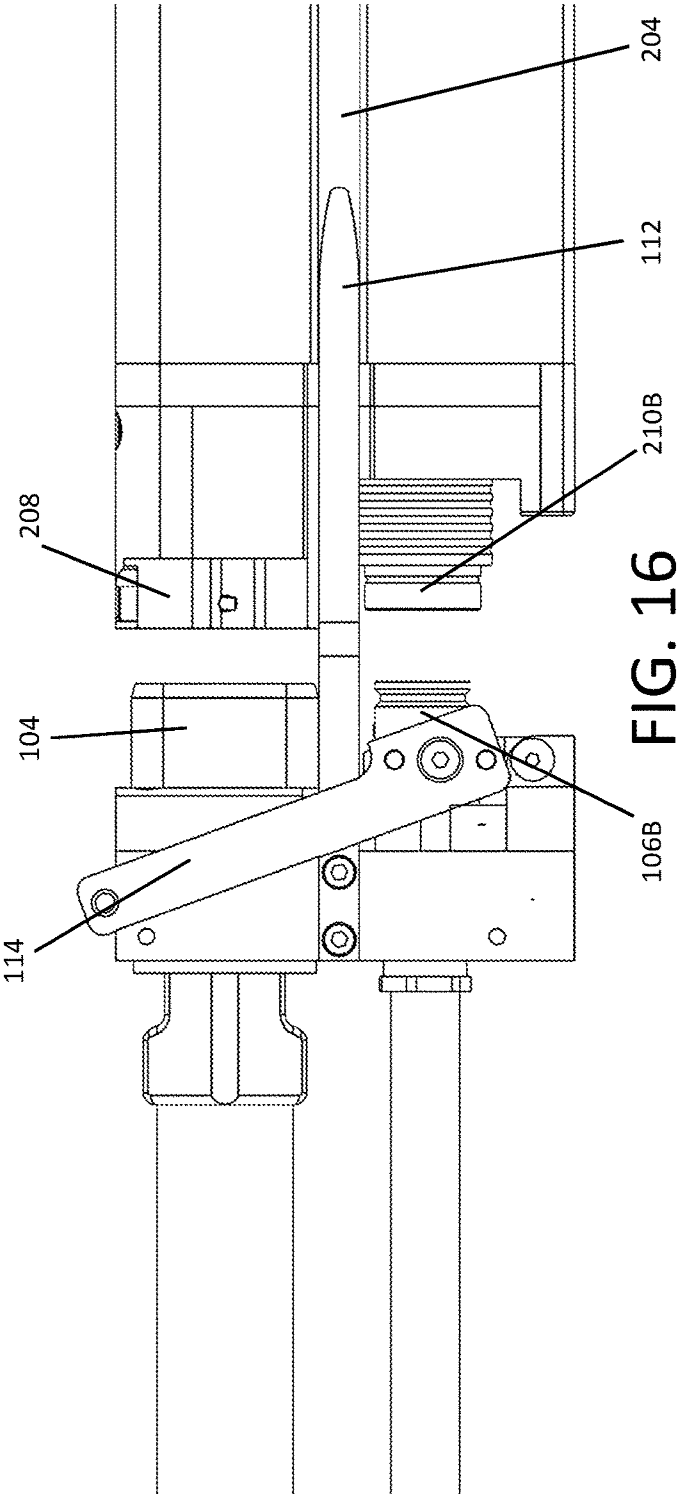
FIG. 16 is a close-up partial side view of an LED light device partially engaged with a docking port according to certain embodiments.

Next, referring to FIGS. 14-16, the LED light device 202 is moved towards the docking port 100 so that the guide rails 112 now engage the LED light device's channels 204. As a result, the respective electrical 104, 208 and fluid 106A, 106B, 210A, 210B fittings are now aligned and alignment errors during the seating operation are avoided.

Figure 17:
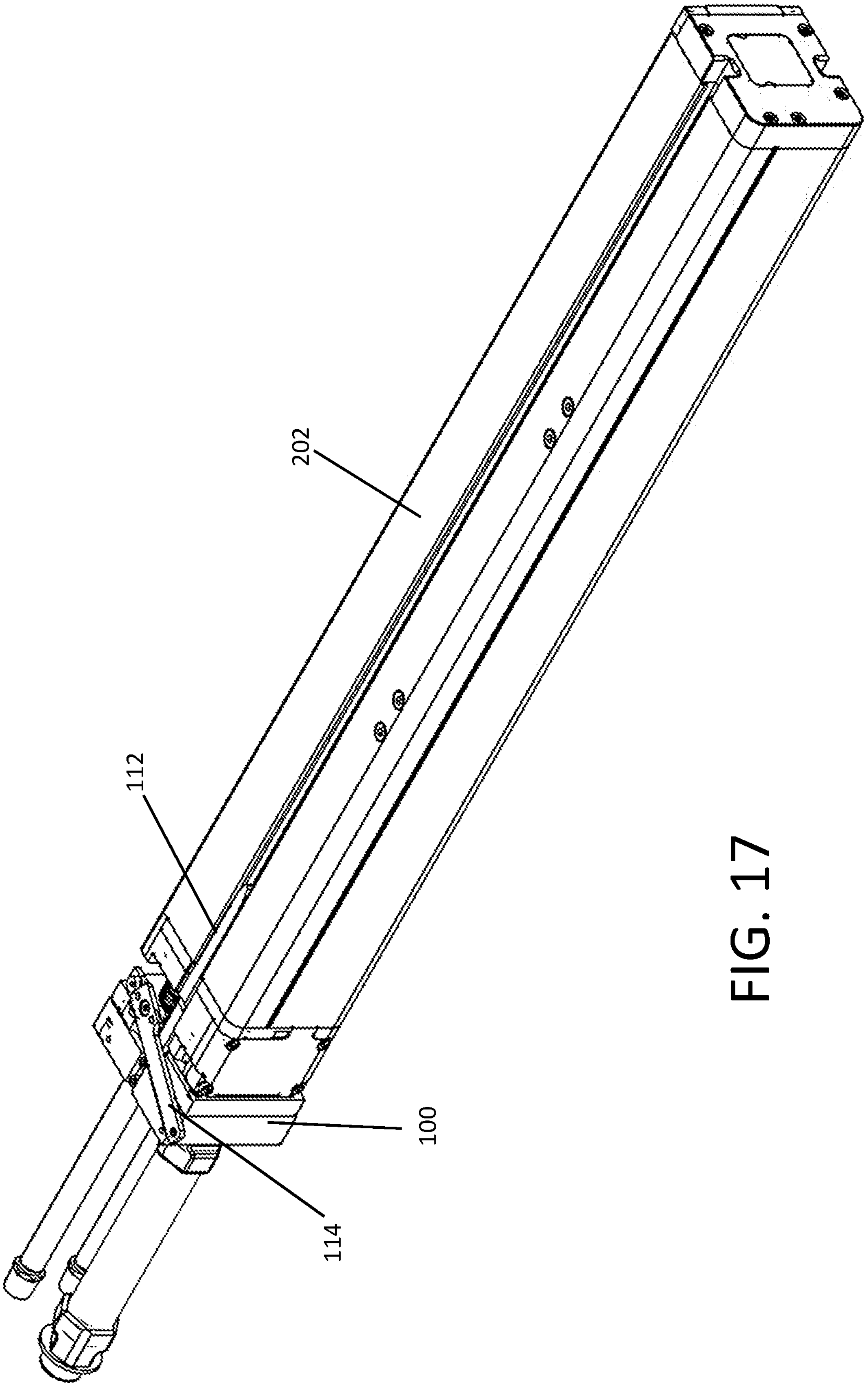
FIG. 17 is a perspective view of an LED light device fully engaged with a docking port in a closed and locked position according to certain embodiments.
Figure 18:
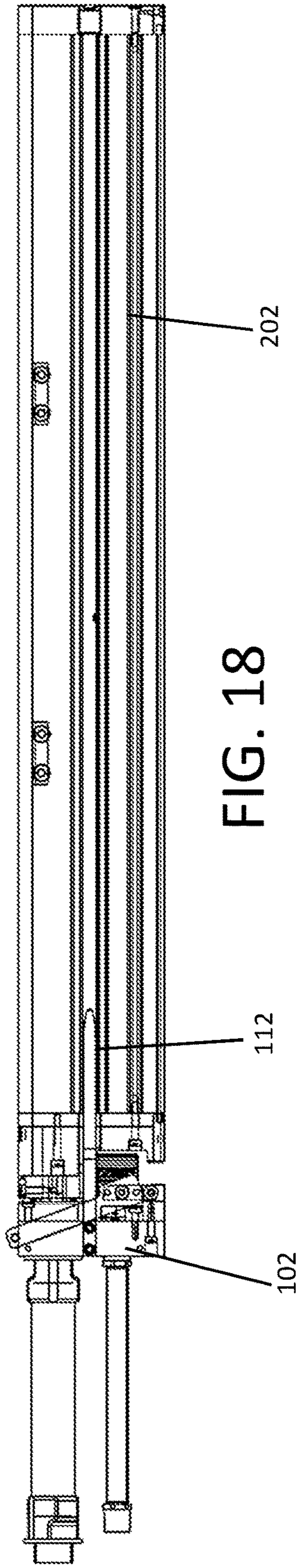
FIG. 18 is a side view of an LED light device fully engaged with a docking port in a closed and locked position according to certain embodiments.
Figure 19:
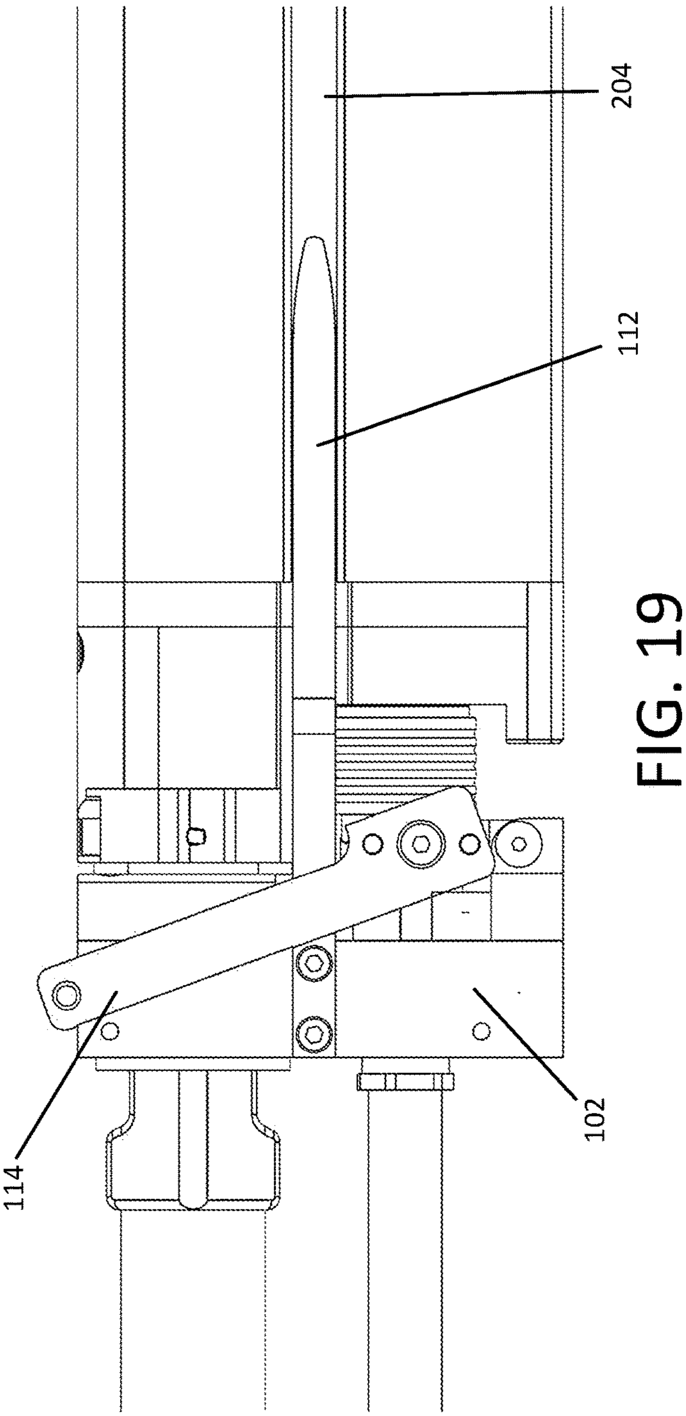
FIG. 19 is a close-up partial side view of an LED light device fully engaged with a docking port in a closed and locked position according to certain embodiments.

Now in FIGS. 17-19, the LED light device 202 is engaged with a docking port 100 in a closed and locked position. The electrical and fluid connections are now completed. In particular the locking balls in the fluid fittings are pressed into place by their locking collars. The latch arm 114 is in the locked state. The arm can be moved automatically by a spring or other bias means to cause the arm to move to the locked position upon completed seating of the respective fittings, or the arm can be moved to the locked state manually by the operator.

Figure 20:
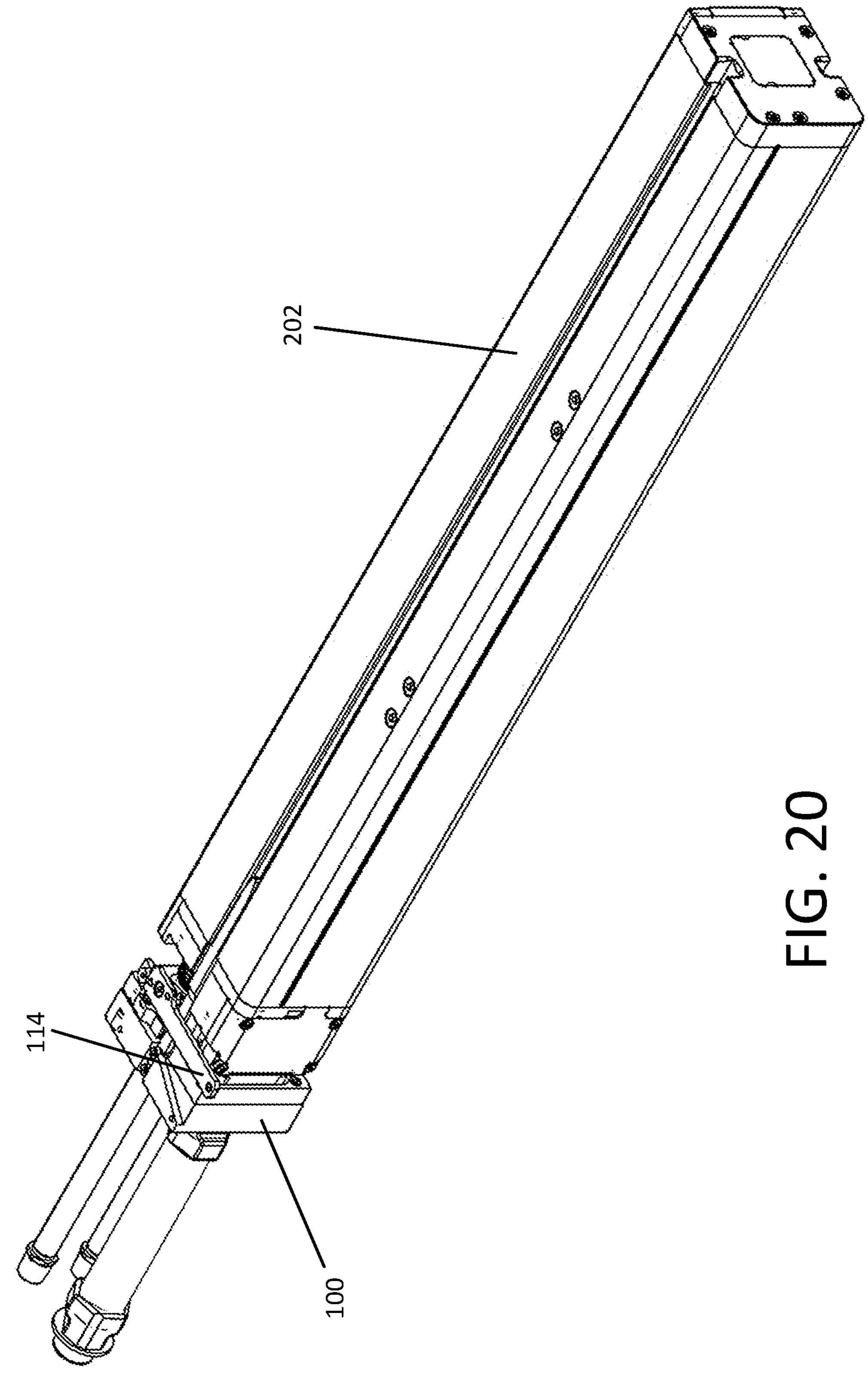
FIG. 20 is a perspective view of an LED light device engaged with a docking port with the release arm actuated on the docking port according to certain embodiments.
Figure 21:
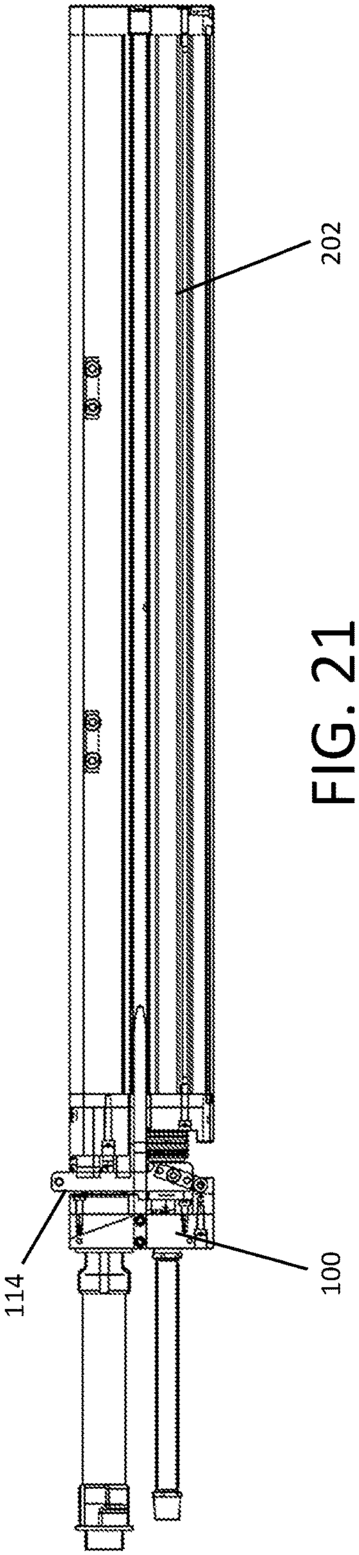
FIG. 21 is a side view of an LED light device engaged with a docking port with the release arm actuated on the docking port according to certain embodiments.
Figure 22:
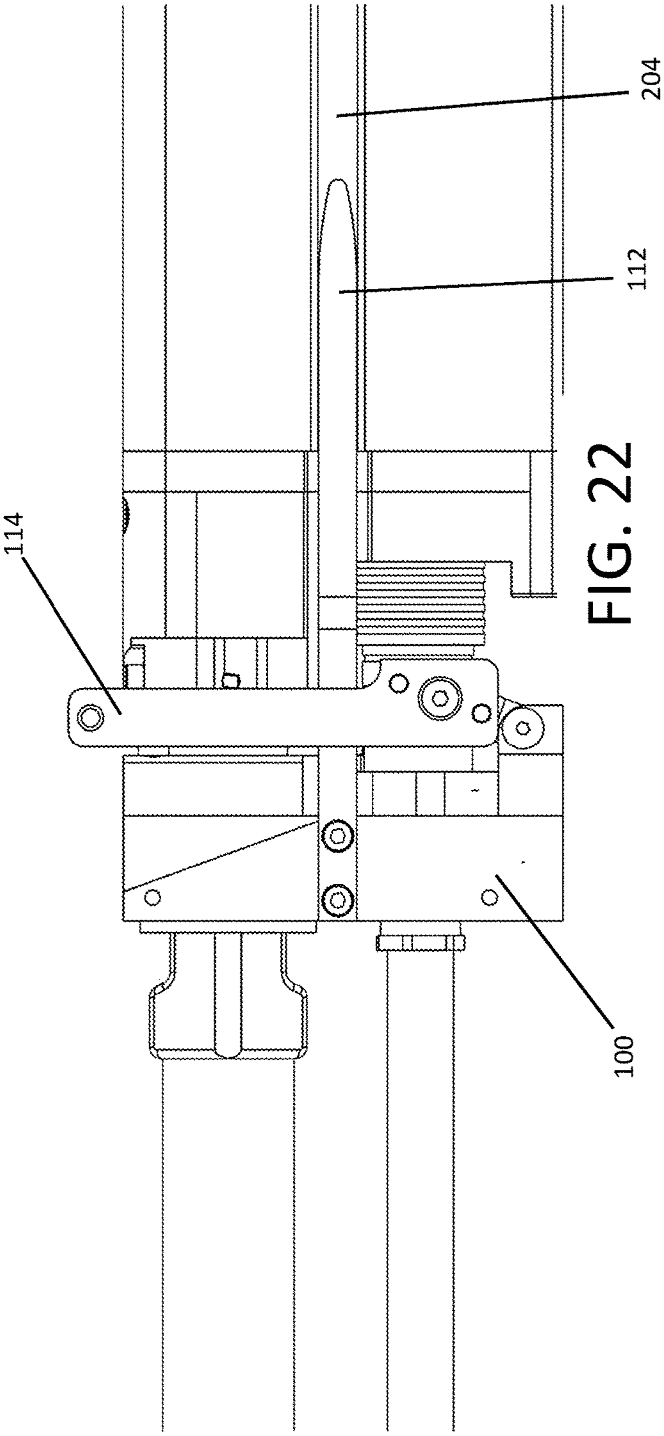
FIG. 22 is a close-up partial side view of an LED light device engaged with a docking port with the release arm actuated on the docking port according to certain embodiments.

Referring to FIGS. 20-22, in order to release the LED light device 202 from its secured engagement with the docking port 100, the latch arm 114 is actuated on the docking port 100. In particular, the latch arm 114 is pulled or moved by the user to the unlocked state, thereby moving the locking collars to their disengagement positions, which allows the locking balls to retract. Pressure in the coolant fluid conduits 110A, 110B pushes the LED light device 202 outward slightly away from the docking port 100.

Figure 23:
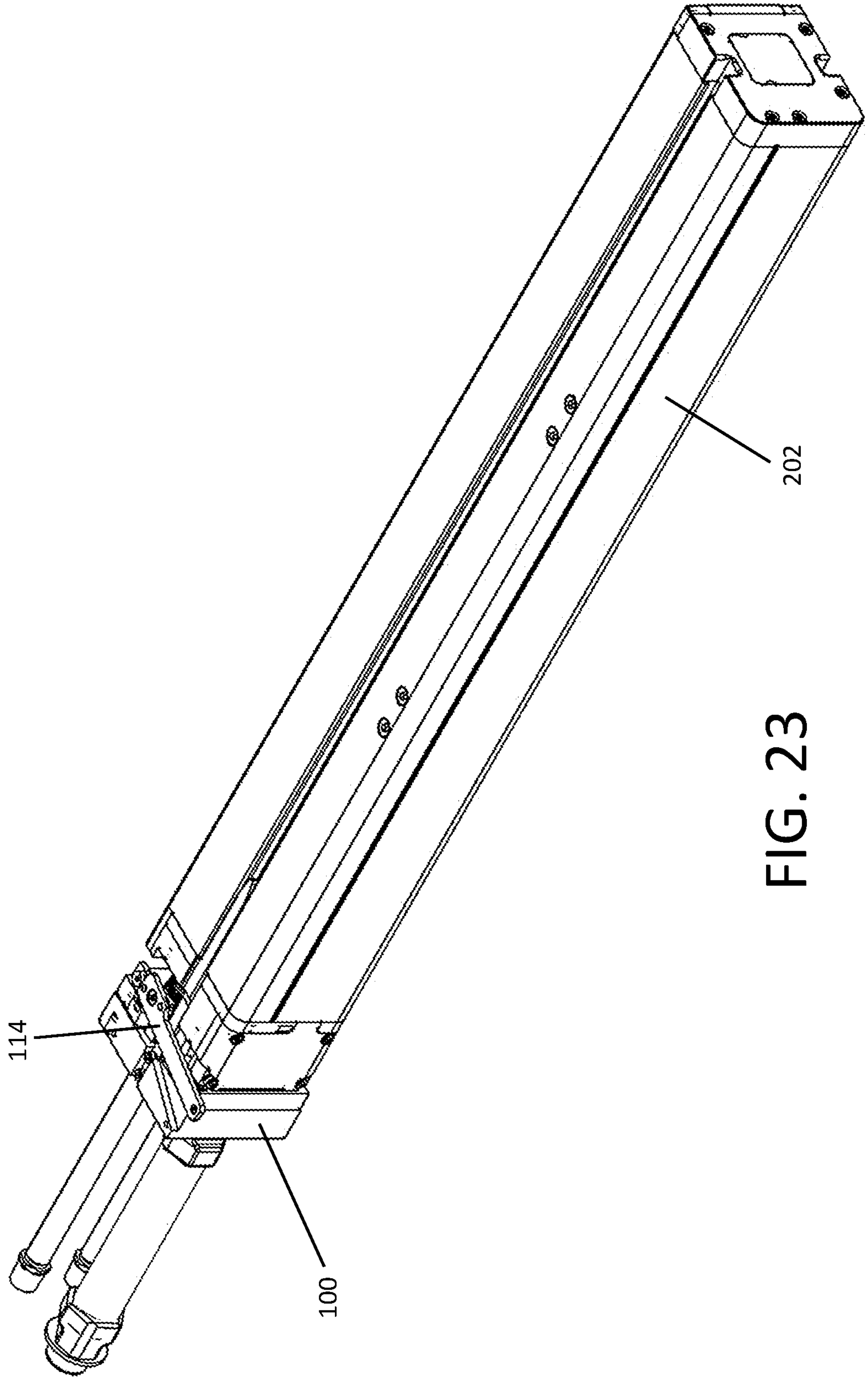
FIG. 23 is a perspective view of an LED light device just released from a docking port according to certain embodiments.
Figure 24:
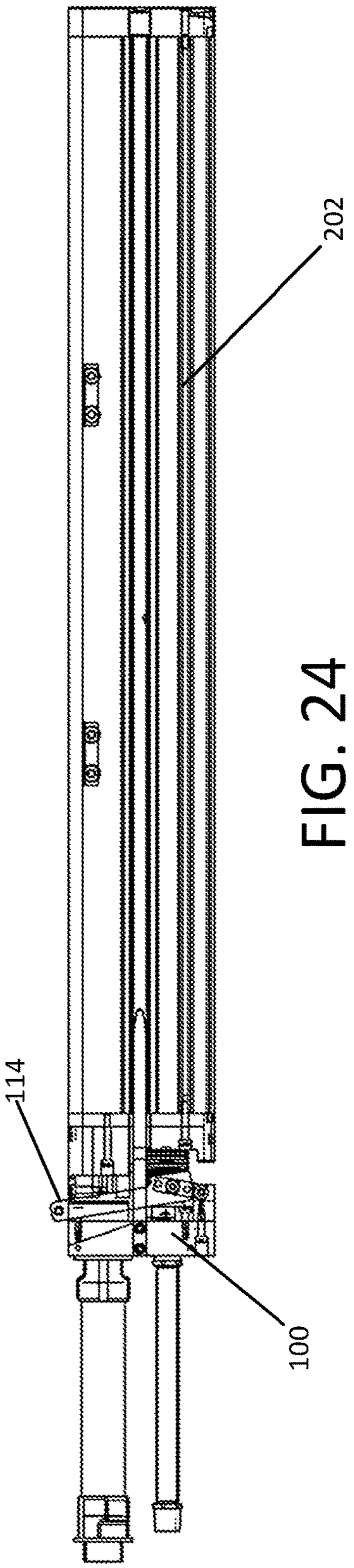
FIG. 24 is a side view of an LED light device just released from a docking port according to certain embodiments.
Figure 25:
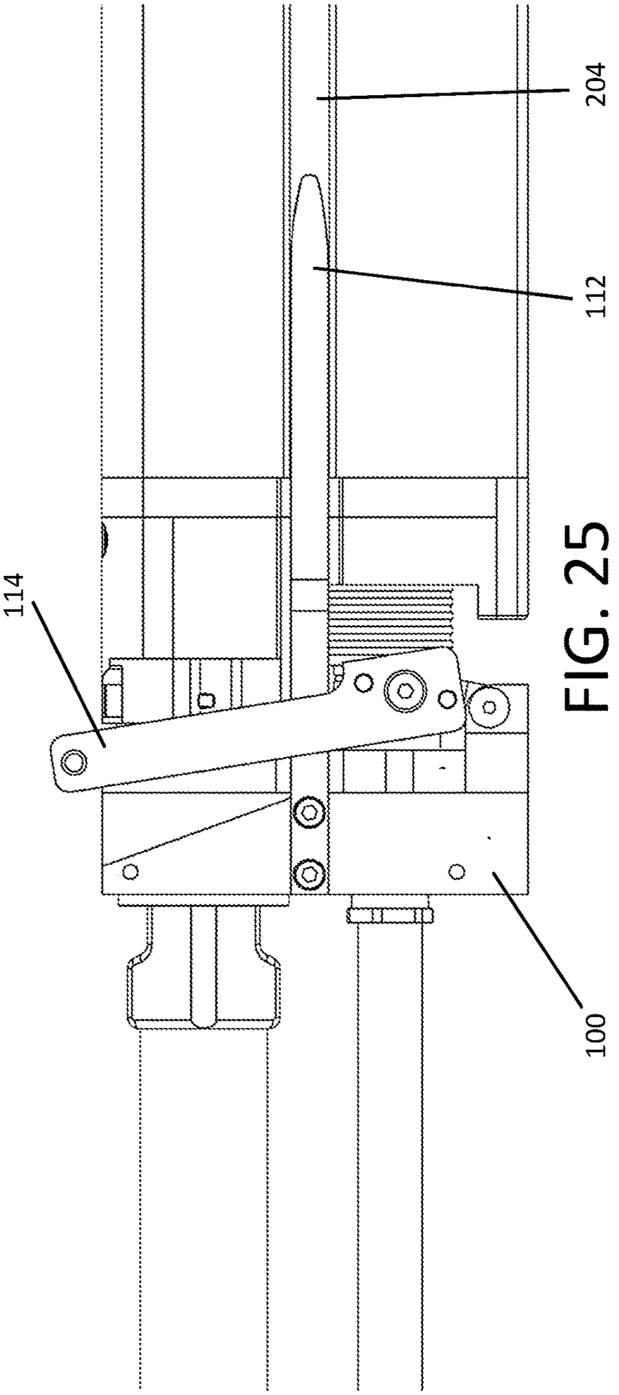
FIG. 25 is a close-up partial side view of an LED light device just released from a docking port according to certain embodiments.

FIGS. 23-25 show the LED light device 202 just released from the docking port 100. The connection of the fluid fittings 106A and 106B have popped open and the fluid fitting valves have sealed. Pulling the LED device 202 further away from the docking port 100 will break the electrical connections in the electrical fitting 104 as well. The user can now fully withdraw the LED light device 202 away from the docking port 100.

Figure 26:
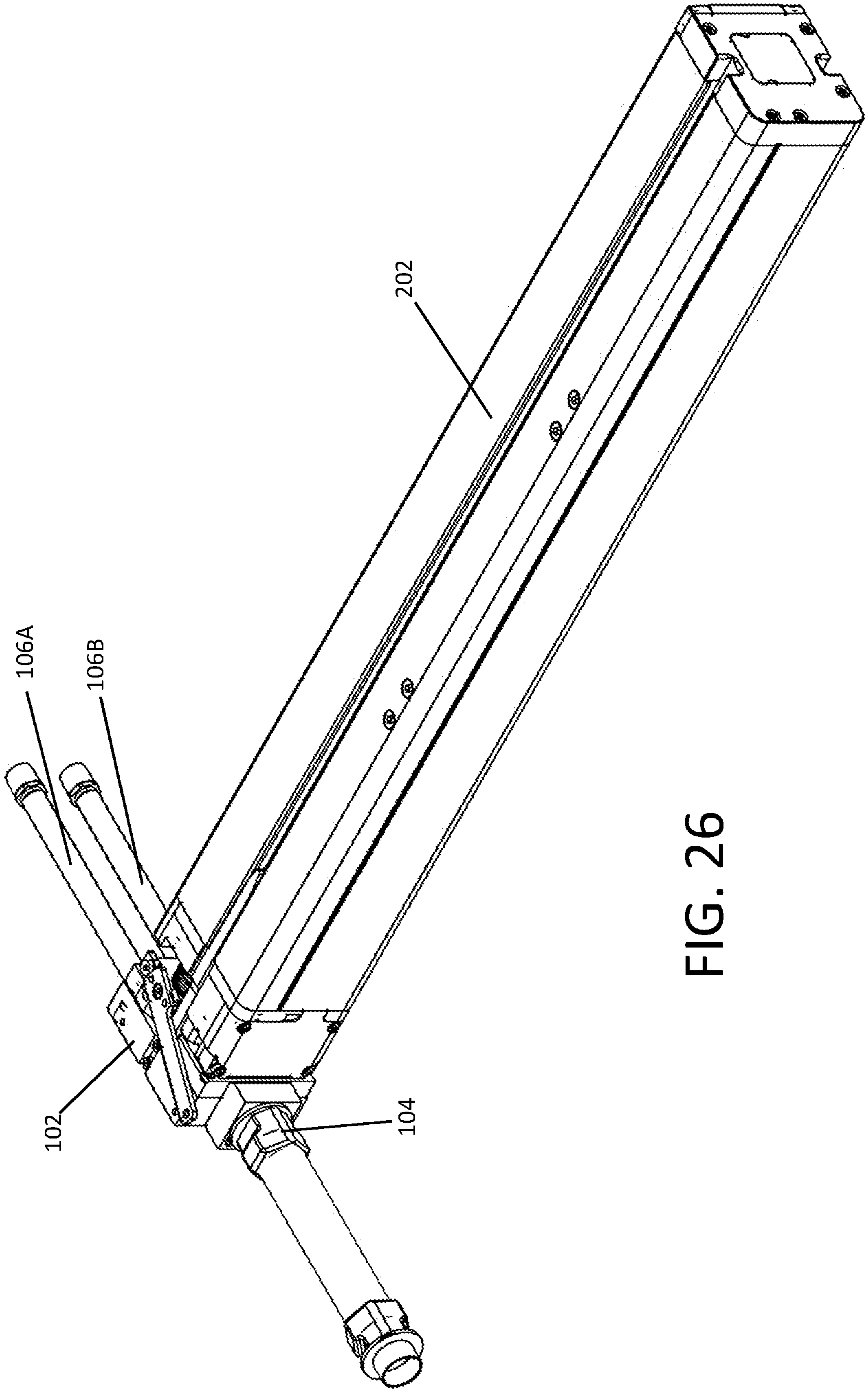
FIG. 26 is a perspective view of an LED light device engaged with an alternative embodiment of a docking port in a closed and locked position according to certain embodiments.
Figure 27:
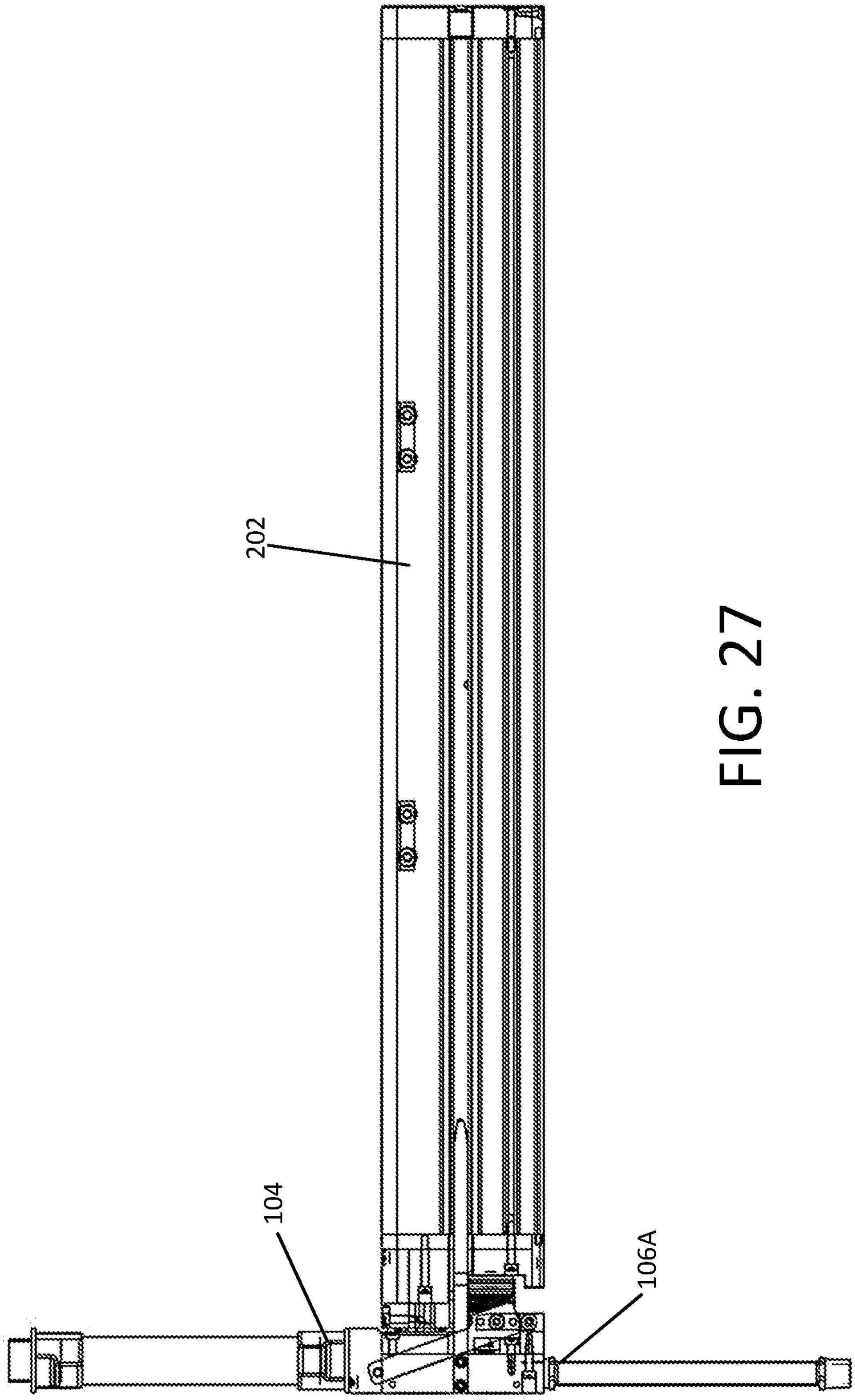
FIG. 27 is a side view of an LED light device engaged with an alternative embodiment of a docking port in a closed and locked position according to certain embodiments.
Figure 28:
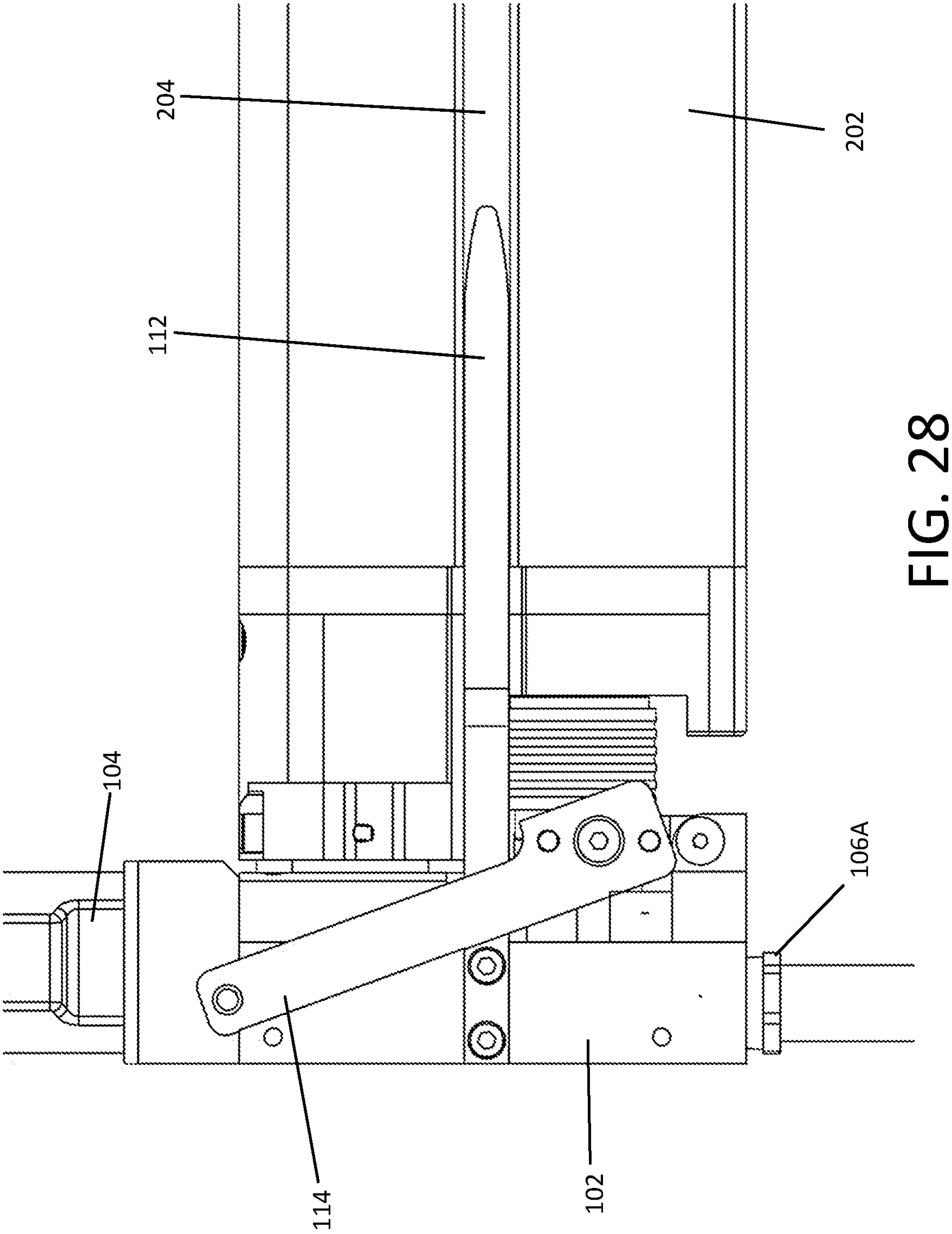
FIG. 28 is a close-up partial side view of an LED light device engaged with an alternative embodiment of a docking port in a closed and locked position according to certain embodiments.
Figure 29:
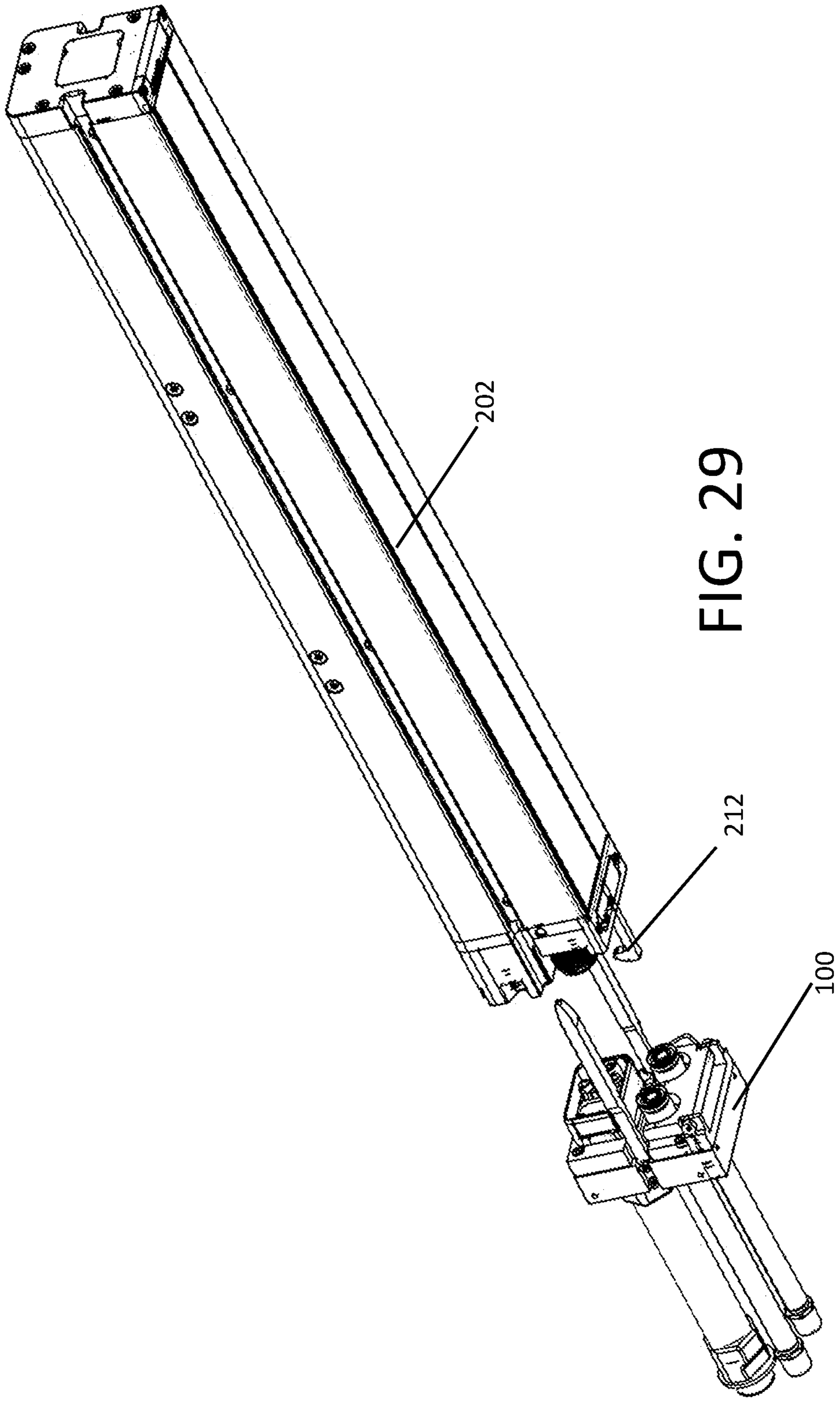
FIG. 29 is a perspective view of an LED light device aligned with a docking port prior to contact with the docking port according to certain embodiments.
Figure 30:
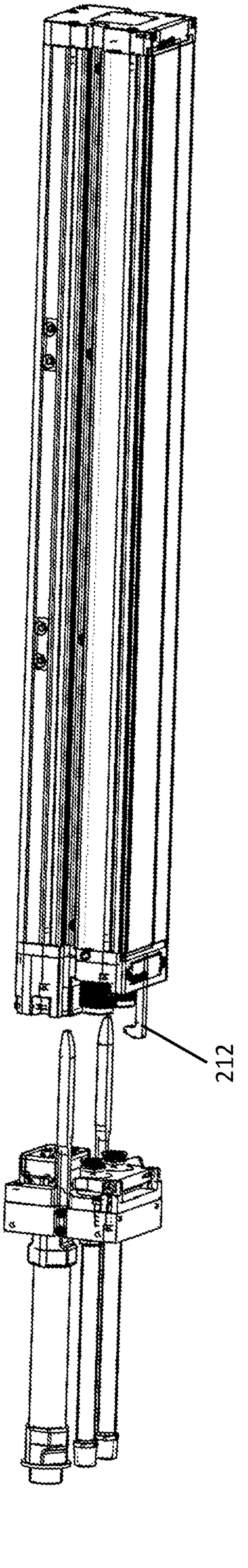
FIG. 30 is another perspective view of an LED light device aligned with a docking port prior to contact with the docking port according to certain embodiments.
Figure 31:
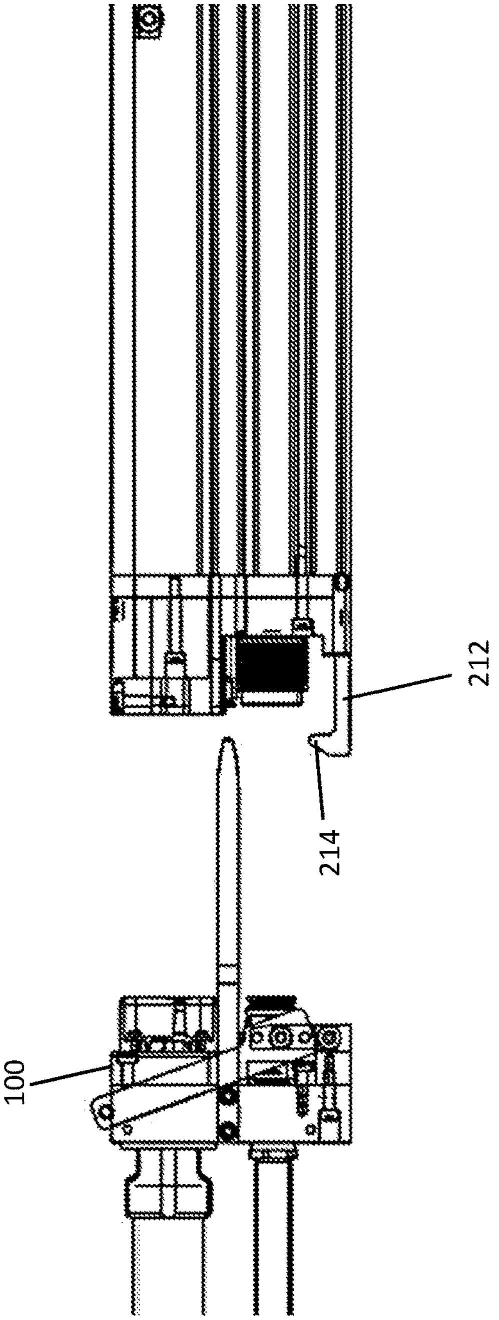
FIG. 31 is a close-up partial side view of an LED light device aligned with a docking port prior to contact with the docking port according to certain embodiments.
Figure 32:
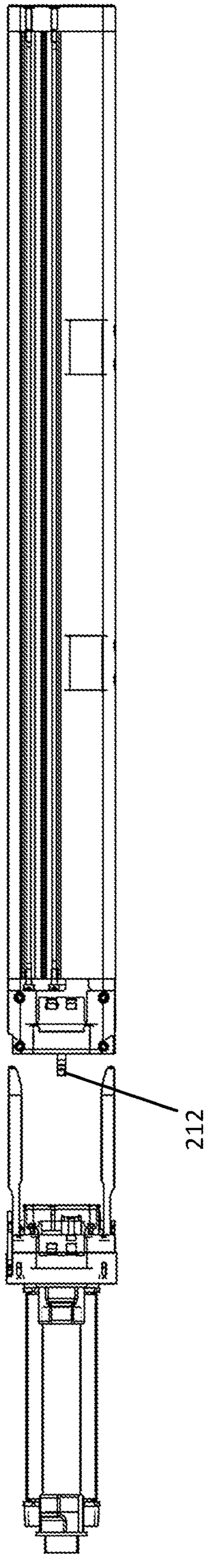
FIG. 32 is a top view of an LED light device aligned with a docking port prior to contact with the docking port according to certain embodiments.

FIGS. 26-28 show the LED light device 202 engaged with an alternative embodiment of a docking port 100. In this embodiment, the body 102 of the docking port 100 comprises electric 108 and fluid 110A, 110B conduits disposed on opposing sides of the body 102 from one another. This is but one of many possible variations on how the fluid and electric conduits can be configured on the body of the docking port 100.

FIGS. 29-32 show an alternative means for locking or securing the LED light device 202 to the docking port 100. A latch member 212 extends from a proximal end of the LED light device 202. The latch member 212 includes a barb or hook 214 on a distal end thereof in order to engage a female latch portion provided to the docking port's body 102.

The latch member 212 extends past the female latch portion of the docking port upon joining of the LED light device 202 with the docking port, thereby preventing the LED light device from backing out of engagement undesirably. Pulling on the latch arm 114 by the user moves the latch member 212 to an unlocked or release position so that the LED light device 202 can be withdrawn from the docking port 100. More than one latch member 212 can be provided, and the location of the latch members 212 can be changed in other alternative embodiments. Other means for locking or securing the LED light device 202 to the docking port 100 can be provided in still other embodiments.

The docking port 100 disclosed herein can also be used with other components where the respective fittings are configured for mating with one another.

For purposes of interpreting the claims for the present invention, it is expressly intended that the provisions of Section 112, sixth paragraph of 35 U.S.C. are not to be invoked unless the specific terms "means for" or "step for" are recited in a claim.

The present invention may be embodied in other specific forms without departing from the spirit or essential attributes thereof, and it is, therefore, desired that the present embodiment be considered in all respects as illustrative and not restrictive. Those skilled in the art may recognize other equivalents to the specific embodiments described herein which equivalents are intended to be encompassed by the claims attached hereto.

What is claimed is:

1. A docking port for a high intensity light emitting diode (LED) light device, the LED light device comprising an elongated body and an end cap disposed at a longitudinal end of the elongated body, the end cap including a first coolant fitting and an electrical fitting, the docking port comprising:

a connection body;

a plurality of fittings disposed on a common side of the connection body, the plurality of fittings including a first fitting configured to mate with the electrical fitting of the LED light device and a second fitting configured to mate with the first coolant fitting of the LED light device;

a release lever; and a guide rail extending forwardly from the connection body away from the common side of the connection body.

2. The docking port of claim 1, wherein the end cap of the LED light device comprises a second coolant fitting, and wherein the plurality of fittings disposed on a common side of the connection body includes a third fitting that is configured to mate with the second coolant fitting of the LED light device.

3. The docking port of claim 1, wherein the guide rail is configured to mate with a channel defined in a sidewall of the LED light device.

4. The docking port of claim 1, comprising a pair of guide rails, each of the pair of guide rails being spaced apart from one another and extending parallel to one another.

5. The docking port of claim 4, wherein each of the pair of guide rails is configured to mate with a respective channel defined in a pair of opposing sidewalls of the LED light device.

6. The docking port of claim 1, wherein the release lever is movable between a locked position and an unlocked position, wherein in the locked position, the LED light device, when mated with the docking port, cannot be disengaged from the docking port, and wherein in the unlocked position, the LED light device can be disengaged from the docking port.

7. The docking port of claim 1, further comprising:

an electric conduit coupled to the connection body, which is in electric communication with the first fitting through the connection body; and a fluid conduit coupled to the connection body, which is in fluidic communication with the second fitting through the connection body.

8. An interchangeable ultraviolet (UV) light system, comprising:

a high intensity UV light source, the UV light source comprising an elongated body and an end cap disposed at a longitudinal end of the elongated body, the end cap including a first coolant fitting and an electrical fitting; and a docking port comprising:

a connection body;

a plurality of fittings disposed on a common side of the connection body, the plurality of fittings including a first fitting configured to mate with the electrical fitting of the UV light source and a second fitting configured to mate with the first coolant fitting of the UV light source;

a release lever; and a guide rail extending forwardly from the connection body away from the common side of the connection body.

9. The interchangeable UV light system of claim 8, wherein the end cap of the UV light source comprises a second coolant fitting, and wherein the plurality of fittings disposed on a common side of the connection body includes a third fitting that is configured to mate with the second coolant fitting of the UV light source.

10. The interchangeable UV light system of claim 8, wherein the guide rail is configured to mate with a channel defined in a sidewall of the UV light source.

11. The interchangeable UV light system of claim 8, comprising a pair of guide rails, each of the pair of guide rails being spaced apart from one another and extending parallel to one another.

12. The interchangeable UV light system of claim 11, wherein each of the pair of guide rails is configured to mate with a respective channel defined in a pair of opposing sidewalls of the UV light source.

13. The interchangeable UV light system of claim 8, wherein the release lever is movable between a locked position and an unlocked position, wherein in the locked position, the UV light source, when mated with the docking port, cannot be disengaged from the docking port, and wherein in the unlocked position, the UV light source can be disengaged from the docking port.

14. The interchangeable UV light system of claim 8, further comprising:

an electric conduit coupled to the connection body, which is in electric communication with the first fitting through the connection body; and a fluid conduit coupled to the connection body, which is in fluidic communication with the second fitting through the connection body.

15. The interchangeable UV light system of claim 8, wherein the end cap of the UV light source further comprises a latch member that extends towards the docking port to secure the UV light source to the docking port when the UV light source is mated with the docking port.

16. The interchangeable UV light system of claim 8, further comprising a housing configured to enclose the UV light source and the docking port, the housing defining an openable end that is selectively closable via a door disposed on the openable end.

17. A method of changing an LED light device, the method comprising:

moving a release lever of a docking port to which the LED light device is mated from a locked position and an unlocked position;

disengaging an electrical fitting of the LED light device from a first fitting disposed on a first side of the docking port;

disengaging a coolant fitting of the LED light device from a second fitting disposed on the first side of the docking port; and moving the LED light device away from the docking port in a direction away from the first side of the docking port.

18. The method of claim 17, further comprising sliding a guide rail along a channel defined in a sidewall of the LED light device as the LED light device is moved away from the docking port.

19. The method of claim 17, further comprising:

moving a replacement LED light device toward the docking port until an electrical fitting and a coolant fitting thereof are mated with a respective one of the first fitting and the second fitting; and moving the release lever from the unlocked position to the locked position.

20. The method of claim 19, further comprising sliding the guide rail along the channel defined in a sidewall of the replacement LED light device as the replacement LED light device is moved toward the docking port.

* * * * *